(12) United States Patent
Martin et al.

(10) Patent No.: US 11,595,270 B2
(45) Date of Patent: Feb. 28, 2023

(54) METHODS AND APPARATUS FOR PROVIDING ADAPTIVE PRIVATE NETWORK CENTRALIZED MANAGEMENT SYSTEM DISCOVERY PROCESSES

(71) Applicant: Talari Networks Incorporated, Cupertino, CA (US)

(72) Inventors: Todd Martin, Campbell, CA (US); Sonia Kiang Rovner, Chapel Hill, NC (US); Justin Allen Patterson, Morrisville, NC (US)

(73) Assignee: Talari Networks Incorporated, Cupertino, CA (US)

( * ) Notice: Subject to any disclaimer, the term of this patent is extended or adjusted under 35 U.S.C. 154(b) by 10 days.

(21) Appl. No.: 17/179,307

(22) Filed: Feb. 18, 2021

(65) Prior Publication Data

US 2021/0176137 A1 Jun. 10, 2021

Related U.S. Application Data

(62) Division of application No. 16/528,092, filed on Jul. 31, 2019, now Pat. No. 11,290,349, which is a
(Continued)

(51) Int. Cl.
*H04L 41/12* (2022.01)
*H04L 41/22* (2022.01)
(Continued)

(52) U.S. Cl.
CPC ............ *H04L 41/22* (2013.01); *G06F 16/214* (2019.01); *G06F 16/278* (2019.01); *G06F 21/33* (2013.01);
(Continued)

(58) Field of Classification Search
None
See application file for complete search history.

(56) References Cited

U.S. PATENT DOCUMENTS

| 3,789,653 | A | 2/1974 | Brejaud |
| 5,121,383 | A | 6/1992 | Golestani |

(Continued)

OTHER PUBLICATIONS

Cooper, D., et al., "Internet X.509 Public Key Infrastructure Certificate and Certificate Revocation List (CRL) Profile," pp. 1-151, Retrieved from the Internet https://tools.ietf.org/html/rfc5280, (May 2008).
(Continued)

*Primary Examiner* — Michael W Chao

(57) ABSTRACT

Systems and techniques are described for a centralized management system operating within a virtual machine which configures, monitors, analyzes, and manages an adaptive private network (APN) to provide a discovery process that learns about changes to the APN through a network control node (NCN) that is a single point of control of the APN. The discovery process automatically learns a new topology of the network without relying on configuration information of nodes in the APN. Network statistics are based on a timeline of network operations that a user selected to review. Such discovery and timeline review is separate from stored configuration information. If there was a network change, the changes either show up or not show up in the discovery process based on the selected time line. Configuration changes can be made from the APN VM system by loading the latest configuration on the APN under control of the NCN.

20 Claims, 11 Drawing Sheets

Related U.S. Application Data division of application No. 14/972,270, filed on Dec. 17, 2015, now Pat. No. 10,476,765.

(60) Provisional application No. 62/187,516, filed on Jul. 1, 2015, provisional application No. 62/133,071, filed on Mar. 13, 2015, provisional application No. 62/132,987, filed on Mar. 13, 2015, provisional application No. 62/133,094, filed on Mar. 13, 2015, provisional application No. 62/132,625, filed on Mar. 13, 2015, provisional application No. 62/096,086, filed on Dec. 23, 2014, provisional application No. 62/096,071, filed on Dec. 23, 2014, provisional application No. 62/096,049, filed on Dec. 23, 2014.

(51) Int. Cl.

| | | |
|---|---|---|
| *H04L 9/40* | (2022.01) | |
| *H04L 43/067* | (2022.01) | |
| *G06F 21/33* | (2013.01) | |
| *H04L 45/00* | (2022.01) | |
| *G06F 16/21* | (2019.01) | |
| *G06F 16/27* | (2019.01) | |
| *H04L 41/0873* | (2022.01) | |
| *H04L 12/28* | (2006.01) | |
| *H04L 41/0806* | (2022.01) | |
| *H04L 41/0896* | (2022.01) | |
| *H04L 43/10* | (2022.01) | |
| *H04L 43/0817* | (2022.01) | |

(52) U.S. Cl.
CPC ...... *H04L 12/2854* (2013.01); *H04L 41/0806* (2013.01); *H04L 41/0873* (2013.01); *H04L 41/0896* (2013.01); *H04L 41/12* (2013.01); *H04L 43/067* (2013.01); *H04L 45/00* (2013.01); *H04L 63/0823* (2013.01); *H04L 43/0817* (2013.01); *H04L 43/10* (2013.01)

(56) References Cited

U.S. PATENT DOCUMENTS

| | | | |
|---|---|---|---|
| 5,185,860 A | 2/1993 | Wu | |
| 5,661,719 A | 8/1997 | Townsend et al. | |
| 5,710,885 A | 1/1998 | Bondi | |
| 6,016,307 A | 1/2000 | Kaplan et al. | |
| 6,262,996 B1 | 7/2001 | Kainulainen et al. | |
| 6,426,947 B1 * | 7/2002 | Banker | H04L 41/046 370/254 |
| 6,456,594 B1 | 9/2002 | Kaplan et al. | |
| 6,458,594 B1 | 10/2002 | Baszczynski et al. | |
| 6,490,617 B1 | 12/2002 | Hemphill et al. | |
| 6,584,567 B1 | 6/2003 | Bellwood et al. | |
| 6,611,863 B1 | 8/2003 | Banginwar | |
| 6,628,623 B1 * | 9/2003 | Noy | H04L 41/0213 370/255 |
| 6,662,221 B1 | 12/2003 | Gonda et al. | |
| 6,665,702 B1 | 12/2003 | Zisapel et al. | |
| 6,738,582 B1 | 5/2004 | Moshe et al. | |
| 6,738,900 B1 | 5/2004 | Hardjono et al. | |
| 6,775,235 B2 | 8/2004 | Datta et al. | |
| 6,822,943 B1 | 11/2004 | Mantin | |
| 6,822,944 B1 | 11/2004 | Mantin | |
| 6,894,972 B1 | 5/2005 | Phaal | |
| 7,010,607 B1 | 3/2006 | Bunton | |
| 7,036,049 B2 | 4/2006 | Ali et al. | |
| 7,349,961 B2 | 3/2008 | Yamamoto | |
| 7,373,661 B2 | 5/2008 | Smith et al. | |
| 7,412,701 B1 * | 8/2008 | Mitra | H04L 41/00 718/1 |
| 7,469,281 B2 * | 12/2008 | Kaneda | H04L 61/106 709/224 |
| 7,542,485 B2 | 6/2009 | Bingham et al. | |
| 7,633,870 B2 | 12/2009 | Elliot | |
| 7,782,787 B2 | 8/2010 | Karol et al. | |
| 7,870,246 B1 | 1/2011 | Davis et al. | |
| 7,877,477 B2 | 1/2011 | Wookey | |
| 7,886,031 B1 | 2/2011 | Taylor et al. | |
| 7,903,585 B2 | 3/2011 | Feng et al. | |
| 7,966,388 B1 | 6/2011 | Pugaczewski et al. | |
| 8,125,907 B2 | 2/2012 | Averi et al. | |
| 8,274,891 B2 | 9/2012 | Averi et al. | |
| 8,291,217 B2 | 10/2012 | Miyazawa | |
| 8,452,846 B2 | 5/2013 | Fredette et al. | |
| 8,582,502 B2 | 11/2013 | Conte | |
| 8,635,447 B1 | 1/2014 | Joyce et al. | |
| 8,644,164 B2 | 2/2014 | Averi et al. | |
| 8,775,547 B2 | 7/2014 | Fredette et al. | |
| 9,407,733 B1 | 8/2016 | Mizrahi | |
| 9,467,536 B1 | 10/2016 | Kanekar et al. | |
| 9,544,182 B2 | 1/2017 | Waldbusser | |
| 9,647,883 B2 | 5/2017 | Neginhal et al. | |
| 9,858,060 B2 | 1/2018 | Barros et al. | |
| 9,860,245 B2 | 1/2018 | Ronda et al. | |
| 9,929,915 B2 | 3/2018 | Erickson et al. | |
| 10,007,559 B1 * | 6/2018 | Gaudlip | H04L 41/0896 |
| 10,038,601 B1 | 7/2018 | Becker et al. | |
| 10,039,018 B2 | 7/2018 | Splitz | |
| 10,225,146 B2 | 3/2019 | Miller et al. | |
| 10,333,808 B2 | 6/2019 | Coleman, Jr. et al. | |
| 10,454,899 B1 | 10/2019 | Gabrielson | |
| 10,476,765 B2 | 11/2019 | Martin et al. | |
| 10,797,962 B2 | 10/2020 | Coleman, Jr. et al. | |
| 11,070,520 B2 | 7/2021 | Stabile et al. | |
| 11,115,223 B2 | 9/2021 | Cignetti et al. | |
| 11,159,394 B2 | 10/2021 | Littlejohn et al. | |
| 11,290,349 B2 | 3/2022 | Martin et al. | |
| 11,469,970 B2 | 10/2022 | Coleman, Jr. et al. | |
| 2002/0027925 A1 * | 3/2002 | Barkai | H04L 9/40 370/408 |
| 2002/0112040 A1 | 8/2002 | Chang et al. | |
| 2002/0116485 A1 * | 8/2002 | Black | H04L 41/344 709/227 |
| 2003/0009547 A1 * | 1/2003 | Benfield | H04L 41/12 709/223 |
| 2003/0115508 A1 * | 6/2003 | Ali | H04L 69/40 714/43 |
| 2003/0123446 A1 | 7/2003 | Muirhead et al. | |
| 2004/0064760 A1 | 4/2004 | Hicks et al. | |
| 2005/0071630 A1 | 3/2005 | Thornton et al. | |
| 2005/0076203 A1 | 4/2005 | Thornton et al. | |
| 2005/0086363 A1 | 4/2005 | Ji | |
| 2005/0094567 A1 | 5/2005 | Kannan et al. | |
| 2005/0193105 A1 * | 9/2005 | Basham | H04L 41/0816 709/223 |
| 2006/0075478 A1 * | 4/2006 | Hyndman | H04L 63/029 726/11 |
| 2006/0091999 A1 * | 5/2006 | Howarth | G06K 17/00 340/5.91 |
| 2006/0095554 A1 | 5/2006 | Kuhles et al. | |
| 2006/0114839 A1 | 6/2006 | Meier et al. | |
| 2006/0271670 A1 | 11/2006 | Blomquist et al. | |
| 2006/0277406 A1 | 12/2006 | Hashimoto et al. | |
| 2007/0112578 A1 | 5/2007 | Randle et al. | |
| 2007/0154016 A1 | 7/2007 | Nakhjiri et al. | |
| 2007/0230361 A1 | 10/2007 | Choudhury | |
| 2007/0288623 A1 | 12/2007 | Kato et al. | |
| 2008/0002576 A1 * | 1/2008 | Bugenhagen | H04L 67/1012 370/229 |
| 2008/0098221 A1 | 4/2008 | Hashimoto et al. | |
| 2008/0098454 A1 * | 4/2008 | Toh | H04L 41/0803 726/1 |
| 2008/0184030 A1 | 7/2008 | Kelly et al. | |
| 2008/0225749 A1 | 9/2008 | Peng et al. | |
| 2009/0055649 A1 | 2/2009 | Takata et al. | |
| 2009/0070486 A1 | 3/2009 | Visser | |
| 2009/0116404 A1 * | 5/2009 | Mahop | H04L 41/12 370/254 |
| 2009/0119630 A1 | 5/2009 | Binder et al. | |
| 2009/0141659 A1 * | 6/2009 | Martin | H04L 41/0213 370/256 |

(56) References Cited

U.S. PATENT DOCUMENTS

| | | | |
|---|---|---|---|
| 2009/0144436 A1 | 6/2009 | Schneider | |
| 2009/0147806 A1 | 6/2009 | Brueckheimer | |
| 2009/0165099 A1 | 6/2009 | Eldar et al. | |
| 2009/0232025 A1* | 9/2009 | Baggott | H04L 41/12 370/254 |
| 2009/0257361 A1 | 10/2009 | Deshpande et al. | |
| 2009/0276841 A1 | 11/2009 | Guo et al. | |
| 2009/0310485 A1 | 12/2009 | Averi et al. | |
| 2009/0327708 A1 | 12/2009 | Hazlewood et al. | |
| 2011/0173681 A1 | 7/2011 | Qureshi et al. | |
| 2011/0191581 A1 | 8/2011 | Shim et al. | |
| 2011/0289134 A1 | 11/2011 | de los Reyes et al. | |
| 2012/0008529 A1 | 1/2012 | Averbuch et al. | |
| 2012/0042032 A1 | 2/2012 | Fredette et al. | |
| 2012/0117273 A1 | 5/2012 | Averi et al. | |
| 2012/0127977 A1 | 5/2012 | Copeland et al. | |
| 2012/0314578 A1 | 12/2012 | Averi et al. | |
| 2013/0024921 A1 | 1/2013 | Gupta et al. | |
| 2013/0110966 A1* | 5/2013 | Nagami | G06F 3/0635 709/214 |
| 2013/0132745 A1* | 5/2013 | Schoening | G06F 1/3209 713/310 |
| 2013/0238743 A1 | 9/2013 | Fredette et al. | |
| 2013/0246603 A1* | 9/2013 | Davis | H04L 61/5007 709/224 |
| 2014/0052811 A1 | 2/2014 | Mao | |
| 2014/0173331 A1 | 6/2014 | Martin et al. | |
| 2014/0185445 A1 | 7/2014 | Averi et al. | |
| 2014/0207971 A1 | 7/2014 | Lecourtier | |
| 2014/0280817 A1 | 9/2014 | Uppalapati et al. | |
| 2014/0376379 A1 | 12/2014 | Fredette et al. | |
| 2015/0071067 A1 | 3/2015 | Martin et al. | |
| 2015/0156025 A1 | 6/2015 | Zhu et al. | |
| 2015/0169340 A1 | 6/2015 | Haddad et al. | |
| 2015/0180769 A1* | 6/2015 | Wang | H04L 45/38 370/236 |
| 2015/0200955 A1 | 7/2015 | Martin et al. | |
| 2015/0281067 A1 | 10/2015 | Wu | |
| 2015/0365288 A1 | 12/2015 | Van Der Merwe et al. | |
| 2016/0066354 A1 | 3/2016 | Oba et al. | |
| 2016/0182305 A1 | 6/2016 | Martin et al. | |
| 2016/0182319 A1 | 6/2016 | Martin et al. | |
| 2016/0182327 A1 | 6/2016 | Coleman, Jr. et al. | |
| 2016/0315845 A1 | 10/2016 | Yu et al. | |
| 2016/0373431 A1 | 12/2016 | Van Den Broeck et al. | |
| 2018/0046469 A1 | 2/2018 | Johansson et al. | |
| 2018/0123892 A1 | 5/2018 | Mellquist | |
| 2019/0253325 A1 | 8/2019 | Coleman et al. | |
| 2019/0356567 A1 | 11/2019 | Martin et al. | |
| 2021/0014129 A1 | 1/2021 | Coleman et al. | |
| 2021/0191750 A1 | 6/2021 | Zhang et al. | |
| 2021/0288875 A1 | 9/2021 | Mach | |
| 2021/0337026 A1 | 10/2021 | Resch et al. | |

OTHER PUBLICATIONS

Non-Final Office Action for U.S. Appl. No. 16/528,092 (dated Feb. 2, 2021).

Commonly-Assigned, co-pending U.S. Appl. No. 17/037,519 for "Methods and Apparatus for Providing Adaptive Private Network Centralized Management System Data Visualization Processes," (Unpublished, filed Sep. 29, 2020).

Notice of Allowance and Fee(s) Due for U.S. Appl. No. 16/362,307 (dated Jun. 15, 2020).

Non-Final Office Action for U.S. Appl. No. 16/362,307 (dated Apr. 20, 2020).

Commonly-Assigned, co-pending U.S. Appl. No. 16/528,092 for "Methods and Apparatus for Providing Adaptive Private Network Centralized Management System Discovery Processes," (Filed Jul. 31, 2019).

Notice of Allowance and Fee(s) Due for U.S. Appl. No. 14/972,270 (dated Jun. 27, 2019).

Applicant-Initiated Interview Summary for U.S. Appl. No. 14/972,270 (dated Apr. 10, 2019).

Commonly-Assigned, co-pending U.S. Appl. No. 16/362,307 for "Methods and Apparatus for Providing Adaptive Private Network Centralized Management System Data Visualization Processes," (Filed Mar. 22, 2019).

Notice of Allowance and Fee(s) Due for U.S. Appl. No. 14/973,193 (dated Feb. 20, 2019).

Examiner's Answer for U.S. Appl. No. 14/972,270 (dated Jan. 28, 2019).

Notice of Allowance and Fee(s) Due for U.S. Appl. No. 14/973,193 (dated Sep. 19, 2018).

Final Office Action for U.S. Appl. No. 14/973,193 (dated Jun. 12, 2018).

Final Office Action for U.S. Appl. No. 14/972,270 (dated Mar. 15, 2018).

Non-Final Office Action for U.S. Appl. No. 14/972,270 (dated Nov. 27, 2017).

Non-Final Office Action for U.S. Appl. No. 14/973,193 (dated Oct. 20, 2017).

Restriction and/or Election Requirement for U.S. Appl. No. 14/973,193 (dated Jun. 28, 2017).

"Adaptive Private Networking Configuration Editor User's Guide APNware Release 2.5", Talari Netwoks, pp. 1-75 (2013).

"HP Network Node Manager i Software", For the Windows®, Linux, HP-UX, and Solaris operating systems, Software Version: 9.21, pp. 1-567 (Aug. 2012).

Notice of Allowance and Fee(s) Due for U.S. Appl. No. 13/353,693 (dated May 24, 2012).

Non-Final Office Action for U.S. Appl. No. 13/353,693 (dated Apr. 2, 2012).

Notice of Allowance and Fee(s) Due for U.S. Appl. No. 12/482,766 (dated Oct. 20, 2011).

Final Office Action for U.S. Appl. No. 12/482,766 (dated Sep. 28, 2011).

Non-Final Office Action for U.S. Appl. No. 12/482,766 (dated Apr. 6, 2011).

Srisuresh et al., "IP Network Address Translator (NAT) Terminology and Considerations," RFC 2663, pp. 1-30 (Aug. 1999).

Krasner, Glenn E. and Pope, Stephen T., "A Description of the Model-View-Controller User Interface Paradigm in the Smalltalk-80 System", ParcPlace Systems, 1988.

Final Office Action for U.S. Appl. No. 16/528,092 (dated Jun. 24, 2021).

Examiner Interview Summary for U.S. Appl. No. 16/528,092 (dated Jun. 18, 2021).

Notice and Allowance and Fee(s) Due for U.S. Appl. No. 17/037,519 (dated Jun. 1, 2022).

Non-Final Office Action for U.S. Appl. No. 17/037,519 (dated Mar. 31, 2022).

Notice of Allowance for U.S. Appl. No. 16/528,092 (dated Nov. 18, 2021).

Applicant-Initiated Interview Summary for U.S. Appl. No. 16/528,092 (dated Nov. 1, 2021).

Advisory Action for U.S. Appl. No. 16/528,092 (dated Oct. 7, 2021).

* cited by examiner

METHODS AND APPARATUS FOR PROVIDING ADAPTIVE PRIVATE NETWORK CENTRALIZED MANAGEMENT SYSTEM DISCOVERY PROCESSES

This application is a divisional of U.S. patent application Ser. No. 16/528,092, filed Jul. 31, 2019, which is a divisional of U.S. patent application Ser. No. 14/972,270, filed on Dec. 17, 2015, which claims the benefit of U.S. Provisional Application Nos. 62/096,049 titled "APN Aware Architecture (Part A)"; 62/096,071 titled "APN Aware Architecture (Part B)" and 62/096,086 titled "APN Aware Architecture (Part C)", all of which were filed on Dec. 23, 2014 and of U.S. Provisional Application Serial Nos. 62/132,625 titled "Aware: An Adaptive Private Network Centralized Management System Discovery Process"; 62/132,987 titled "Aware: An Adaptive Private Network Centralized Management System Timestamp Correlation Process"; 62/133,071 titled "Aware: Adaptive Private Network Database Schema Migration and Management Processes" and 62/133,094 titled "Aware: Adaptive Private Network Centralized Management System Data Visualization Process" all of which were filed on Mar. 13, 2015 and of U.S. Provisional Application Ser. No. 62/187,516 titled "Methods and Apparatus for Providing Adaptive Private Network Centralized Management System Time Correlated Playback of Network Traffic" which was filed on Jul. 1, 2015 and all of which are incorporated by reference herein in their entirety.

CROSS REFERENCE TO RELATED APPLICATIONS

Related implementations of the present inventions have been disclosed in four other copending U.S. patent applications claiming the benefit of the provisional applications cited above and that have the same assignee as the present patent application. The related copending U.S. patent applications are 1) U.S. patent application Ser. No. 14/972,353, filed Dec. 17, 2015 entitled "Methods and Apparatus for Providing Adaptive Private Network Centralized Management System Timestamp Correlation Processes"; 2) U.S. patent application Ser. No. 14/972,514, filed Dec. 17, 2015 entitled "Methods and Apparatus for Providing Adaptive Private Network Database Schema Migration and Management Processes"; 3) U.S. patent application Ser. No. 14/973,193, filed Dec. 17, 2015 entitled "Methods and Apparatus for Providing Adaptive Private Network Centralized Management System Data Visualization Processes" and 4) U.S. patent application Ser. No. 14/973,343, filed Dec. 17, 2015 entitled "Methods and Apparatus for Providing Adaptive Private Network Centralized Management System Time Correlated Playback of Network Traffic". The four related copending U.S. patent applications are hereby incorporated by reference in their entirety.

The present application is also related to U.S. patent application Ser. No. 14/146,786 filed on Jan. 3, 2014 which is a divisional of U.S. patent application Ser. No. 13/592,460 filed on Aug. 23, 2012 which issued as U.S. Pat. No. 8,644,164 which is a continuation of U.S. patent application Ser. No. 13/353,693 filed on Jan. 19, 2012 which issued as U.S. Pat. No. 8,274,891 which claims the benefit of and priority to U.S. patent application Ser. No. 12/482,766 filed on Jun. 11, 2009 which issued as U.S. Pat. No. 8,125,907 entitled "Flow-Based Adaptive Private Network with Multiple WAN-Paths", all of which claim the benefit of U.S. Provisional Patent Application No. 61/060,846 entitled "Flow-based Adaptive Private Network with Multiple WAN-Paths" filed Jun. 12, 2008; U.S. patent application Ser. No. 14/291,776 filed on May 30, 2014 which is a continuation of U.S. patent application Ser. No. 13/850,411 filed on Mar. 26, 2013 which issued as U.S. Pat. No. 8,775,547 and which is a continuation of U.S. patent application Ser. No. 13/208,825 filed on Aug. 12, 2011 entitled "Adaptive Private Network Asynchronous Distributed Shared Memory Services" which issued as U.S. Pat. No. 8,452,846, all of which claim the benefit of U.S. Provisional Patent Application Ser. No. 61/372,904 entitled "Adaptive Private Network Asynchronous Distributed Shared Memory Services" filed Aug. 12, 2010; U.S. patent application Ser. No. 13/719,433 filed on Dec. 19, 2012 entitled "An Adaptive Private Network with Geographically Redundant Network Control Nodes"; U.S. patent application Ser. No. 14/019,723 filed on Sep. 6, 2013 entitled "An Adaptive Private Network with Path Maximum Transmission Unit (MTU) Discovery Process"; U.S. patent application Ser. No. 14/481,335 filed on Sep. 9, 2014 entitled "Adaptive Private Network with Dynamic Conduit Process"; all of which have the same assignee as the present application, are related applications, and are hereby incorporated by reference in their entirety.

FIELD OF THE INVENTION

The present invention relates generally to improved network management. More specifically, the present invention relates to improved methods for configuring, monitoring, and analyzing an adaptive private network.

BACKGROUND OF THE INVENTION

Wide area network (WAN) standards include, for example, digital subscriber line (DSL), asymmetric digital subscriber line (ADSL), and multiprotocol label switching (MPLS), to mention a few. WANs are used to connect local area networks (LAN's) allowing devices in one location to communicate with devices and their users in other locations. In a WAN having a large number of remote sites, direct connections between the sites are many times statically configured. The dynamics of the network system may also change over time making repeated static configurations of the network inefficient and costly to implement. Further, static connections involve reservations of network resources. As data flow patterns change in the network, the reserved resources create non-optimal static connections which cause the network to reserve bandwidth that could be better used elsewhere in the network.

A model-view-controller (MVC) design pattern was articulated in the 1988 paper "A Description of the Model-View-Controller User Interface Paradigm in the Smalltalk-80 System" by Krasner and Pope. This MVC design pattern divides an application into the three components: a model, a view, and a controller. The model component maintains state of underlying data and applies operations on that data. The view component is responsible for rendering of the data controlled by the model to a user. The view component is notified about changes to the data by the model and updates the rendered view of the data. The controller component is responsible for taking input from the user and sending appropriate messages to the model. A view component and controller component are typically paired and communicate with the same model component. A model component may interact with multiple sets of views and controllers. It is generally assumed in a framework of the MVC design pattern that the model has the ability to broadcast changes in the model to the views and controllers that it is connected with. However, this assumption does not hold in web applications. In web applications, a web browser updates its view only based on a request to the server that holds the model. As a result, changes to the model cannot be automatically pushed to the user interface. The MVC design pattern is a theoretical framework which provides a guide for system developers and is not related to any specific system. Further, the MVC design pattern framework by itself does not provide improved performance, reliability, and predictability of a network.

As networks become larger and more complex, administrative techniques for managing the network are increasingly more complex and costly. Prior techniques to separately configure, monitor, and analyze each node of a large network may not provide accurate information and are prone to errors.

SUMMARY OF THE INVENTION

Among its several aspects, the present invention recognizes what is needed is a management technique that provides more accurate and lower cost techniques to configure, monitor, analyze a network, and to present related data in a user friendly manner. Among its several aspects, the present invention addresses systems and techniques which improve discovery, database management, graph tree reporting, replay, and time correlation. To such ends, an embodiment of the invention applies to a method for discovery of nodes in an adaptive private network (APN). An APN is configured with a central server and a network control node (NCN) operating as a single point of control of the APN. The APN comprises a plurality of client nodes and the NCN at a configured management IP address is separate from each client node and administers and controls the plurality of client nodes within the APN. The NCN receives a management IP address from each of the client node of the plurality of client nodes for storage in the NCN. The central server queries the NCN for the management IP addresses of the plurality of client nodes to provide APN topology information by a single point of access to the APN.

Another embodiment of the invention addresses a method for providing security in a network. A first network manager is configured in a first server with a first private key and a first public security certificate for an adaptive private network (APN) having a network control node (NCN) and a plurality of client nodes. The NCN is separate from each client node and administers and controls client nodes within the APN. Under control of a network administrator, the first public security certificate is transferred from the first network manager to the NCN for installation on the NCN, wherein the first public security certificate contains a public key corresponding to the first private key. A first certificate file including the first public security certificate and an associated first hash of the first certificate file is automatically distributed by the NCN to the client nodes, wherein the first public security certificate and first public key are stored in each of the client nodes. In each client node of the one or more client nodes, a generated hash of the distributed first certificate file matches the associated first hash to verify the first public security certificate was properly received, wherein the first server manages the APN.

A further embodiment of the invention addresses a method to discover operating statistics for an adaptive private network (APN). An APN is configured with a centralized management virtual machine (VM) system, the APN VM system, a network control node at a specified management Internet protocol (IP) address, and a plurality of client nodes, wherein the NCN is separate from each client node and is a single point of control of the plurality of client nodes within the APN. A list of each client node at an associated management IP address of the plurality of client nodes is requested by the APN VM system from the single point of control NCN. Each client node is contacted by the APN VM system at the associated management IP address that was returned by the NCN to gather client node information including connectivity information between client nodes in the APN.

A more complete understanding of the present invention, as well as other features and advantages of the invention, will be apparent from the following detailed description, the accompanying drawings, and the claims.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1A:
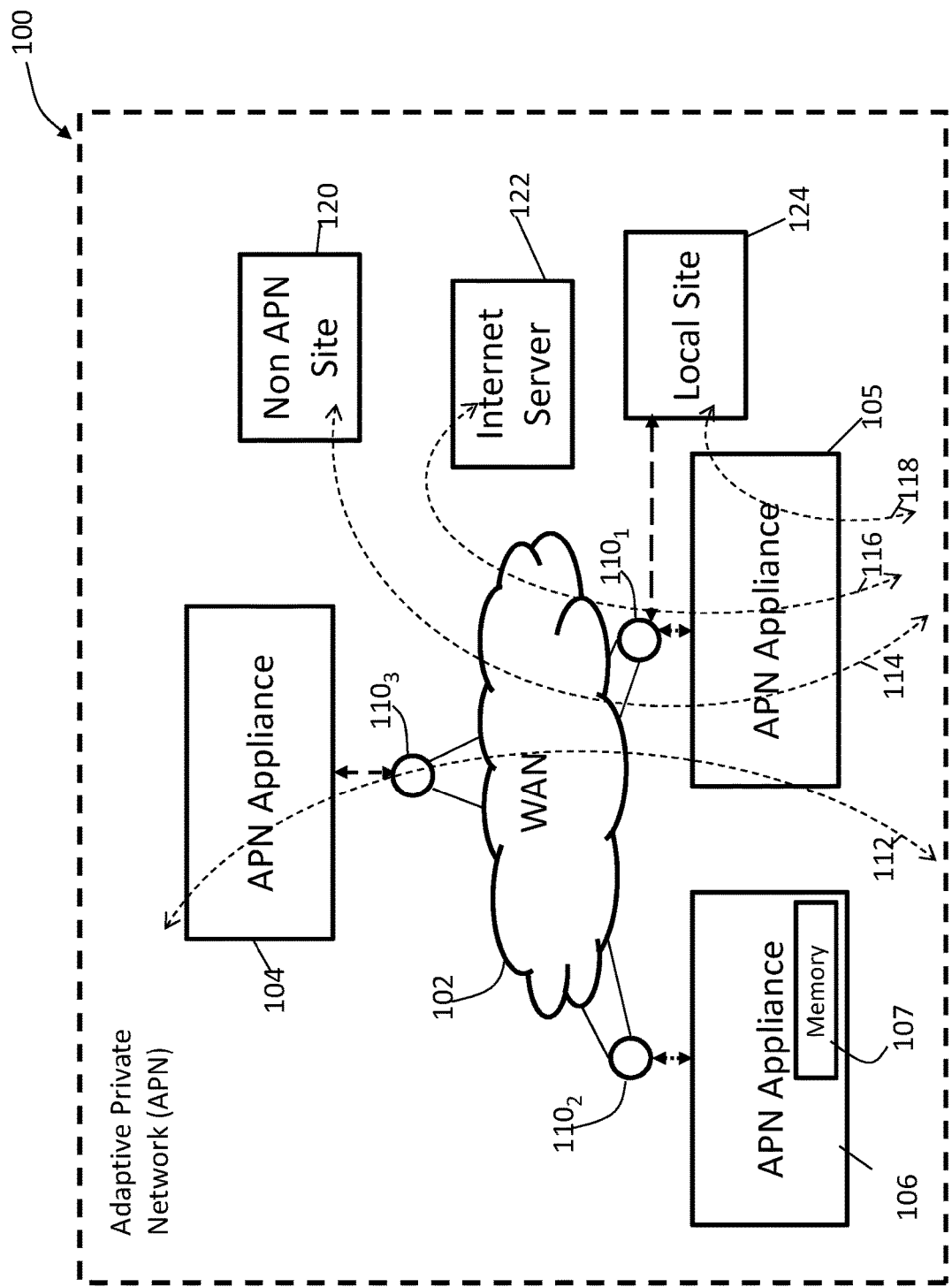
FIG. 1A illustrates an adaptive private network (APN) with APN network service paths in accordance with an embodiment of the present invention.

FIG. 1A shows an example of an adaptive private network (APN) 100 in which the present invention may be suitably employed as described in further detail below, including the network components, flows, paths, and services. The APN 100 includes one or more wide area networks (WANs), such as WAN 102, APN appliances 104-106, WAN routers $110_1$-$110_3$, and network application services as well as APN conduits between APN appliances, as described in more detail below. First, however, a number of terms used herein are defined with the meaning they have when used in the context of the present invention.

An APN path is a logical connection established between two WAN links located at different geographic sites across a WAN.

An APN conduit is a virtual connection between two APN nodes, also referred to as client sites, and formed by aggregating one or more APN paths and their allocated WAN link resources. The conduits overlay a virtual network on top of the underlying network.

A conduit maximum transmission unit (MTU) is a minimum link MTU of the one or more APN paths between a source site and a destination site.

An APN appliance (APNA) is a device that contains APN client site functionality including all software modules within. A high availability site contains two APNAs, one that is active and one that is in a standby mode of operation and available to become active in place of the other APNA if required.

A WAN link represents a physical access point to the wide area network (WAN), such as a digital subscriber line (DSL) connection or a cable modem. The distinctive characteristic of a WAN link is the bandwidth, or in other words, the amount of data capacity available for transmission and reception. WAN links can be shared among APN conduits, and intranet and Internet network services. In the present embodiments, the APN appliances do not directly attach to WAN links. APN appliances communicate with WAN links through logical connections, such as the WAN routers $110_1$-$110_3$ of FIG. 1A.

A private WAN link provides a physical access point to non-public WAN destinations. Examples of such private WAN links include an asynchronous transfer mode (ATM) link with an ATM virtual circuit, a frame relay link with a frame relay circuit, a multiprotocol label switching (MPLS) tunnel, a virtual private network (VPN) tunnel, or a leased point-to-point line. Connectivity on a network having a private WAN link is made to a private list of destinations on the other end of the network. A public WAN link represents a physical access point to the Internet. It can be assumed that any public WAN link can establish a connection to any other public WAN link.

A local WAN link (LWL) is an APN client site's access point to a WAN. A site A's LWL is coupled to a corresponding remote WAN link for a site B. For a conduit between a site A and a site B, site A's local WAN links are site B's remote WAN links.

A routing domain represents a group of sites that can reach each other via an intermediate site that has WAN-to-WAN forwarding enabled. All local routes of each site in the routing domain are added to all other sites in the routing domain.

A static conduit is a conduit configured in a configuration file and created at startup time of an APNA. A static conduit is not removed without changing the configuration file.

A dynamic conduit is a conduit created between APN clients when needed and which can be removed when no longer needed.

An APN service is a set of processing steps performed on packets that are transmitted through the APN. As illustrated in FIG. 1A, data traffic that moves through APN 100 and APN appliance 106 may require different types of services depending on where the sending and receiving stations are located. An APN service instance is a particular configured contextual instance of an APN service held in an APN appliance memory 107 internal to the APN appliance 106, for example. An APN service instance's memory contains, but is not limited to, context specific configuration data, statistical data, and tracking states data. For example, an APN client site may have multiple APN conduits that connect to remote APN client sites. For each APN conduit, there exists a separate APN service instance for the APN conduit service type.

An APN conduit service associated with path 112 manages network traffic packets that are transmitted through the APN 100 from the APN appliance 105 through router $110_1$, through the WAN 102, through another router $110_3$ to APN appliance 104. The APN conduit service for path 112 operates on both APN appliances 104 and 105. The APN conduit service sends and receives data between a first geographic location that has an APN appliance 105 and a different geographic location that has an APN appliance 104 utilizing the full benefits provided by the APN conduit service for WAN resource allocation and network adaptation. An APN intranet service associated with path 114 is used to manage the sending and receiving of data between a first geographic location that has the APN appliance 105 and a different geographic location within an enterprise non-APN site 120 that does not have an APN appliance by way of a WAN link that is also utilized by other APN services.

In another embodiment, an APN intranet service, such as the one associated with path 112, may be used to send and receive data to and from a different geographic location that has an APN appliance, but an administrator selectively configures the APN not to use the APN conduit service 112 for a particular type or class of traffic. An APN Internet service associated with path 116 is used to send and receive data between a first geographic location that has the APN appliance 105 and a different geographic location that is external to an enterprise network by way of a WAN link that is also utilized by other APN services. For example, traffic using the APN Internet service may be associated with a network user accessing a public Internet web server 122. An APN pass through service 118 is used to send and receive data between a first geographic location that has an APN appliance 105 and a local site 124 within the same first geographic location. In another embodiment, an APN pass through service may be used to send and receive data between a first geographic location that has the APN appliance 105 and a different geographic location within an enterprise network that does not have an APN appliance and does not traverse the WAN using any WAN links associated with any other APN services.

Dynamic conduits address changes in statically configured networks that are not just slow, gradual changes in network usage, but are happening in real time throughout a day across a global network. In real time, dynamic conduits dynamically optimize network performance adapting to changing communication patterns between nodes in the network. Dynamic conduits can also be used to offload traffic from intermediate nodes that may be experiencing congestion.

An adaptive private network (APN) software product according to the present invention runs as a centralized management system within a virtual machine to create APN configurations and to monitor system resources, analyze system resources, and manage a configured APN in operation as addressed further herein. Aware is a product name for a presently preferred embodiment of the centralized management system that includes capabilities that monitor, analyze, and provide discovery, timestamp correlation, and database schema migration processes of the present invention. The APN software of the invention, also referred to as APN virtual machine (VM) software, provides analysis and monitoring capabilities that are timely with respect to events to be tracked and monitored while the APN is in operation and provides storage for historical data as taught further herein. The APN system, also referred to as an APN VM system, reduces the time to configure APN appliances and the number of errors that can occur in configuring a system, as well as, to provide detailed performance data correlated across the WAN. The APN system further allows a centralized virtual single point of control by a network control node (NCN) for a physical network in which the NCN provides system wide timing synchronization. The centralized single point of control is not limited to a central location within a network of nodes, may be at any point within the network, and may be coupled at a point that would be considered outside the boundary of a network. Centralized indicates the single point of control aspects of the APN as described further herein.

An onboard configuration facility is a software component designed to plugin to the APN system of the invention and provide an APN configuration compiler, APN configuration editing capabilities, and to provide an ability to create and edit network maps showing nodes of the APN and conduits between the nodes. Each version of the APNA software produces a version of the onboard configuration facility that understands an object model and configuration options for that version of APNA software. The APN system supports installation of multiple concurrent onboard configuration facility plugins so that a single APN software version can manage a variety of APNA software configuration versions. Each version of APNA software, the appliance code, is provided with a default version of the configuration facility, which is also referred to as a configuration plugin. Multiple configuration plugins may be installed. So, the term "onboard" is in reference to the configuration facility or "plugin" when it is running on the APN VM system or on an NCN.

An onboard configuration editor is a component of the onboard configuration facility that represents an APN configuration as a hypertext markup language (HTML) tree and accepts changes to the APN configuration from a user. The onboard configuration editor is closely coupled with a configuration compiler to make changes to the configuration HTML tree. The onboard configuration editor also integrates with a network map facility to display site nodes in a visual map representation of the APN.

An APN configuration file is a text file which describes a configuration of the APN. This configuration file serves as an input to the configuration compiler which generates registries for each APNA in the network.

The configuration compiler is a software program, such as a Java™ program, that can run on an APN system and converts an APN configuration file into either registries for use by APNAs or into an extensible markup language (XML) representation of the object model for use by the onboard configuration facility.

A configuration package is a software data file which contains the APN configuration file along with metadata. Such metadata includes the network maps that are derived from a specific APN configuration.

An onboard configuration facility package consists of the onboard configuration facility in a format which can be installed onto the APN system.

Adaptive private network appliance (APNA) settings are management settings that can be set directly on an APNA. These APNA settings include time parameters, such as for a time zone or time zones and for network time protocol (NTP) including an NTP server address, settings for a Netflow server, user authentication, simple network management protocol (SNMP), event handling, and periodic status reports. These APNA settings are generally not configurable through the APN configuration file. Rather, the APNA Settings are managed on a network-wide basis through the APN controls and software of the invention.

A dashboard, in the context of the APN system, is a user configurable display screen which may be customized to display a subset of items from the rest of the APN system. Multiple dashboards may be created with one being chosen as a default home screen for a particular user.

Workspaces are a construct which allow a user to organize a set of objects, allowing the user to save and recreate a state of a management session. Workspaces are used in a similar manner to use of a 'project' in a software integrated development environment (IDE) which collects a set of source code files and associated build scripts and resources such as help text and images to create a complex graphical application.

Figure 1B:
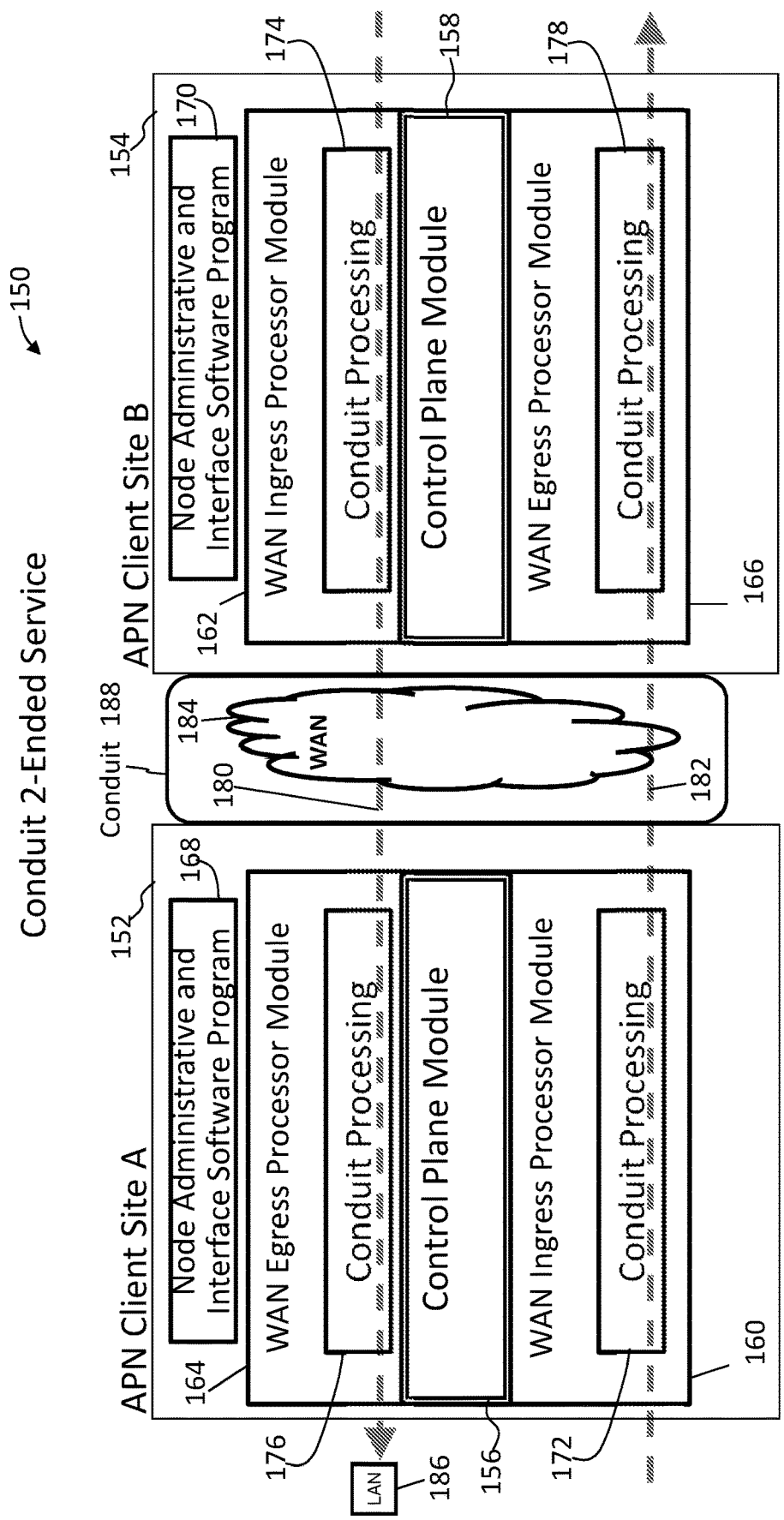
FIG. 1B illustrates an adaptive private network (APN) conduit providing two-ended service between a client site A and a client site B in accordance with an embodiment of the present invention.

FIG. 1B illustrates an adaptive private network (APN) conduit supporting two-ended service 150 between an APN client site A 152 and an APN client site B 154 in accordance with an embodiment of the present invention. Each APN client site is also considered a node in the APN and contains a collection of software modules which govern its participation within the APN. The software modules for the APN client site A 152 and the APN client site B 154 include control plane modules 156 and 158, WAN ingress processor modules 160 and 162, WAN egress processor modules 164 and 166, and node administrative and interface software program modules 168 and 170, respectively. As illustrated in FIG. 1B, the WAN ingress processor modules 160 and 162 include conduit services 172 and 174, and WAN egress processor modules 164 and 166 include a duplicate conduit service 176 and 178. Intranet service, Internet service, and pass through service are also provided at each APN client site. Each APN service type, including conduit, intranet, Internet, and pass through service types, implements processes for each type of data traffic that is communicated to and from the WAN respectively.

As illustrated in FIG. 1B, APN conduit traffic, identified by bold dashed arrow paths 180 and 182, flows through the two APN client sites 152 and 154 as the traffic traverses the APN. WAN ingress processing module 162 of APN client site B 154 performs the WAN ingress conduit service processing 174 prior to transmitting the traffic 180 via the WAN 184 to the APN client site A 152. WAN egress processor module 164 of the APN client site A 152 performs the WAN egress conduit service processing 176 prior to transmitting the traffic 180 to the node or nodes located on LAN 186. The binding of the one APN client site's WAN ingress conduit processing 174 to the peer APN client site's WAN egress conduit service processing 176 constitutes an APN conduit 188 in which traffic is actively monitored and managed across multiple WAN resources.

The APN is capable of using disparate asymmetric WAN links which frequently vary in behavior of bandwidth, latency, jitter, packet loss and congestion over time. For example, the APN can use an asymmetric DSL WAN link that transmits data at 512 kbps upstream to the WAN and 6 Mbps from the WAN through the public network combined with a private symmetric leased circuit T1 WAN link that transmits data at 1544 kbps upstream and downstream and a cable broadband connection that transmits data at 312 kbps upstream to the WAN and 3 Mbps from the WAN to a peer having adequate aggregation bandwidth of these rates for a single transmission control protocol (TCP) file transfer session at a theoretical transmit rate of 2368 kbps and receive at 10544 kbps or 10.544 Mbps. Practically, under good network behavior, the actual rate would approach 90% of these rates. If the behavior of the connection was to change, for example the paths to the DSL link were to have dramatic levels of loss, the APN would, using its high frequency performance feedback mechanism, adapt the network to avoid or mitigate the issues by using alternative resources or attempting to recover from the loss.

In all path selections, conduit paths are evaluated and the best available path is selected. Any paths currently in a path quality good state are eligible to be chosen first. If multiple paths are in a path quality good state, then an estimated end to end time is evaluated and compared for each path, and the path with the lowest end to end time is chosen. If no path is in path quality good state, then a path with the highest bandwidth path quality bad state is chosen. A "one way time" (OWT) refers to the amount of time it takes for a packet to traverse a network from source to receiver. In the context of this invention, the one way time is measured by subtracting a receive time stamp from a WAN Egress Module 166 from the send time stamp from a WAN Ingress Module 160, FIG. 1B.

Figure 1C:
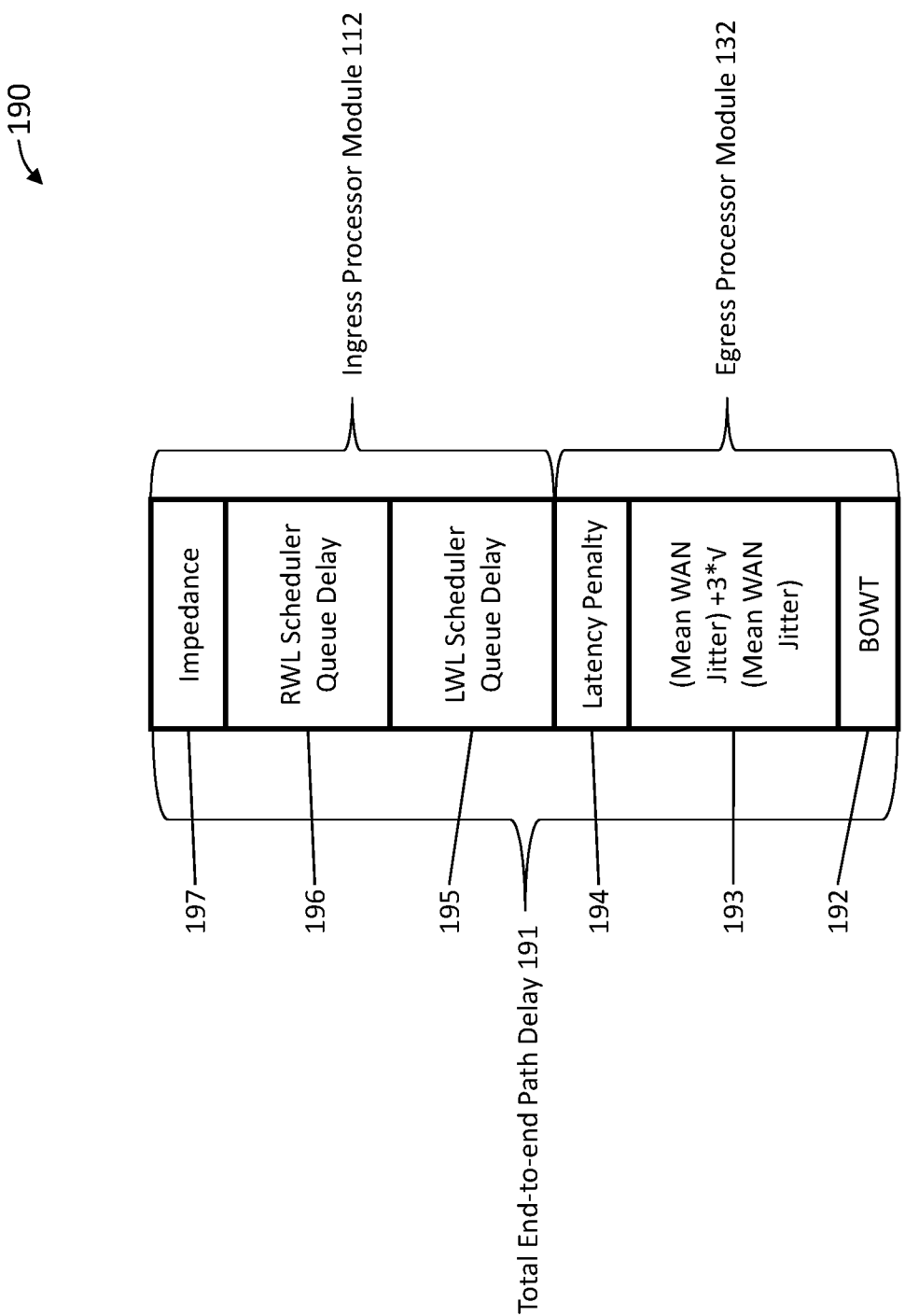
FIG. 1C illustrates a representation of factors used to determine the total end-to-end path delay in accordance with an embodiment of the present invention.

FIG. 1C illustrates a representation of factors 190 used to determine the total end-to-end path delay 191 in accordance with an embodiment of the present invention. The term "best one way time" (BOWT) refers to the lowest measured OWT for a particular packet on a particular path over a period of time. Initially, the evaluation process chooses one best path based on path latency which is calculated using a best one way time (BOWT) 192, mean WAN jitter 193, latency penalty for short term instability 194 and WAN link scheduler's queue delay times 195 and 196, with additional preferential treatment referred to as impedance 197 applied to any prior primary path for the APN traffic flow, if a primary path exists. Thus, an exemplary formula for estimating total end-to-end path delay is the BOWT 192+(mean WAN jitter 193)+3*($\sqrt{}$(mean WAN jitter 193))+latency penalty 194+local WAN link (LWL) scheduler queue delay 195+remote WAN link (RWL) scheduler queue delay 196+ impedance 197. The BOWT 192, mean WAN jitter 193 and latency penalty 194 are provided by a remote APN conduit state resulting from control messaging from the egress processor module 166 of FIG. 1B. The local WAN link scheduler queue delay 195, remote WAN link scheduler queue delay 196 and impedance 197 are provided by the WAN ingress processor module 160 of FIG. 1B. U.S. Pat. No. 8,125,907 filed on Jun. 11, 2009 entitled "Flow-Based Adaptive Private Network with Multiple WAN-Paths" and incorporated by reference herein in its entirety provides further exemplary details of a presently preferred approach to timing and network control in an adaptive private network (APN) at col. 6, line 1-col. 19, line 27, for example.

APN path processing services are responsible for providing a means of communicating user data and control information from one APN node to another APN node across the network. In particular, user data and control information may be transmitted from the WAN ingress processor module 160 of one APN node across the WAN and received at the WAN egress processor module 166, as shown for example in FIG. 1B. Exemplary APN path services which may suitably be provided are listed below:

1. Universal path tagging of all conduit traffic sent across the WAN with high resolution and highly synchronized APN time stamps to enable the highly predictive estimation of transmission latency and statistical variation of latency, subsequently in tandem a control plane modules' path state monitoring service is used to detect optimal paths for traffic to use across the APN.

2. Use of the above optimal path identification to provide, in tandem with a WAN link accounting module, WAN bandwidth reallocation from low performing paths to higher performing paths.

3. Universal path tagging, of all conduit traffic sent across the WAN APN path with path sequence numbers, enables sub second detection of packet loss enabling fast retransmission of user packets with little to no negative effect to the end users.

4. Continual monitoring of and characterization of network behavior at times of lower utilization using heartbeats for fast reaction when network demand does arrive, such as provided by a heartbeat generator.

5. The ability to identify and proactively solicit retransmission when network traffic has been extraordinarily delayed or if the network has ceased to function using a Nag method, as provided by a Nag process, operating on the path state monitoring module.

6. Universal path tagging of all conduit traffic with network utilization and non-utilization of WAN link resources enabling early detection and avoidance of network congestion prior to the packet loss that is typical of normal TCP like congestion methods.

7. The ability to transmit time sensitive control messages without typical internal scheduling delays for software process staging to rate schedulers, while still maintaining proper long utilizations to the APN network to do retransmission of lost packets without the highly predictive estimation of transmission latency and statistical variation of latency.

The APN client node uses timing data to adjust or calibrate a network time by using a linear algebraic calculation based on the slope-intercept form. In a current implementation, y is the time at an APN control node, also referred to as a network control node (NCN), and x is the client node local time, b is the base offset between the two, and m is the rate of change of y versus x which is the slope. Using these definitions, an equation in slope-intercept form $y=mx+b$ is expressed as network time=slope*client local time+base.

The slope is calculated by taking two samples over a pre-specified period and averaging the samples together. The base offset is calculated by taking the difference of the value between the network control point time and the client time, adjusted for one half round trip time (RTT).

Using queuing theory, Poisson distribution assumptions, and a highly accurate APN wide APN clock sync that allows for accurate one way time measurement, a method is provided that is typically capable of estimating path latency and statistical jitter with an accuracy approaching ~99%. An equation which may be suitably used is best one way time (BOWT)+(Mean WAN Jitter)+3*($\sqrt{}$(mean WAN jitter)). This equation provides a very accurate inference with just a few samples of traffic over a short period.

A path state represents the most current condition of the network path as determined by feedback received by the WAN egress APN node's path state monitoring process. As packets are received, the sequence numbers of the packets are tracked to see if any packets were lost in transit between the WAN ingress APN node and the WAN egress APN node. A method is used to trigger path state transitions that are biased toward more tolerance for loss in the short periods of packets received with substantially less tolerance of loss over longer periods. A unique aspect of this approach is the ability to track the path's packet loss thresholds over numerous durations nearly simultaneously and continually while still maintaining low processor overhead. This aspect is obtained through the universal path tagging of conduit traffic sent across the WAN with high resolution and highly synchronized APN time stamps to enable the highly predictive estimation of transmission latency and statistical variation of latency. In tandem, a control plane modules' path state monitoring service is used to detect packet loss and optimal paths for traffic to use across the APN. The result is an ability to detect a difference between occasional incidental short term network loss and long term persistent problems.

In a presently preferred embodiment, the APN node's software modules are stored and operate in the same physical APN appliance; however, the modules may also exist in separate physical APN appliances in alternative embodiments. The methods described in connection with the embodiments disclosed herein may be embodied directly in one or more software modules executed by a processor and memory complex such as a rack mounted processing device, a personal computer, a server, or the like, having one or more central processing unit devices. The processor and memory complex, for example, may be configured to execute instructions that access data and operate on data under control of a software module program stored on a computer readable non-transitory storage medium either directly associated locally with the processor and memory complex, such as may be available through an instruction cache, or accessible through an I/O device. A software module may reside in a computer readable non-transitory storage medium which may include random access memory (RAM), flash memory, dynamic random access memory (DRAM), synchronous dynamic random access memory (SDRAM), read only memory (ROM), programmable read only memory (PROM), erasable programmable read only memory (EPROM), electrically erasable programmable read only memory (EEPROM), hard disk, a removable disk, a CD-ROM, digital video disk (DVD), other types of removable disks, or any other suitable non-transitory storage medium. A non-transitory storage medium may also be coupled to the processor and memory complex such that the hardware processor can read information from, and write information to, the storage medium over an intranet or the Internet.

An adaptive private network node (APN client site) contains software modules required to participate in an adaptive private network. An APN node may exist in one or more APN appliances at a location. An APN node contains a collection of software modules which govern its participation within an APN such as control plane modules 156 and 158, WAN ingress processor modules 160 and 162, and WAN egress processor modules 164 and 166 in FIG. 1B.

The control plane module is responsible for controlling and participating in the control of the APN node in tandem with other APN nodes in the network.

The WAN ingress processor module 160 may suitably be embodied as software and hardware components responsible for processing network traffic for transmission from a local area network (LAN) to a WAN. The WAN egress processor module 164 may suitably be embodied as software operating on hardware components, such as a processor and memory complex that is responsible for processing network traffic for transmission from a WAN to a LAN. WAN ingress and WAN egress processor modules are discussed in further detail below. The APN client site's control plane module 156 may suitably be embodied as software operating on hardware components, such as a processor and memory complex that utilizes the APN client site's WAN ingress processor module 160 and WAN egress processor module 164 as the means for transmitting and receiving APN node to APN node control data across the WAN.

Software packages for an APN are distributed through the WAN using control packets, termed Tapplication protocol (TAP), that is part of change management software or through administrative interfaces, such as downloading software using interfaces 168 and 170 to the APN client sites. The TAP is a protocol that is run on the WAN to allow processes outside of t2_app on different appliances to communicate with each other. The t2_app is a program that is running on each APNA communicating with other APNAs in the APN while forwarding user data. After a software update, the APN services on the APN client sites 152 and 154 are then restarted thus bringing the APN software node configuration into synchronization.

Figure 2:
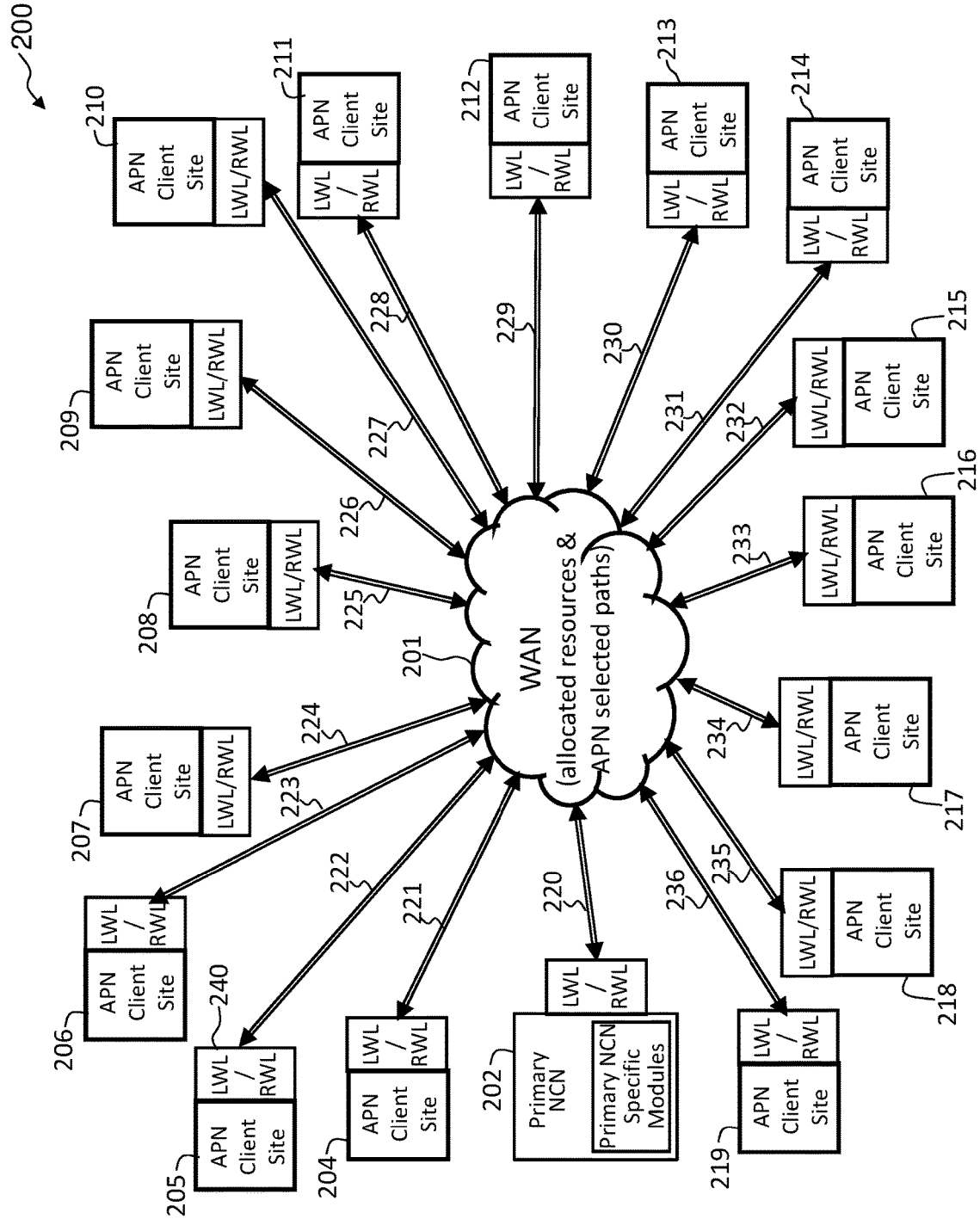
FIG. 2 illustrates an APN having an APN network control node (NCN) and sixteen APN conduits coupled to sixteen APN client sites in accordance with an embodiment of the present invention.

FIG. 2 illustrates an APN 200 having an APN network control node (NCN) 202 coupled to conduit section 220 and sixteen APN conduit sections 221-236 coupled to sixteen APN client sites 204-219, respectively, in accordance with an embodiment of the present invention. As illustrated in FIG. 2, in a presently preferred embodiment, APN 200 is centrally configured. A network administrator configures the entire APN 200 through an APN configuration file that is processed by the NCN 202. The NCN 202 then distributes the configuration settings to all client sites in the APN 200. This method of configuring the APN 200 is intended to provide benefits to the administrator by providing a single point of configuration to the network. It also assures configuration consistency and compatibility for all APN client sites in the network nearly simultaneously, with strict version checking. In a presently preferred embodiment, an intensive configuration audit and validation is done to the configuration prior to that configuration being applied to the network. This audit greatly decreases risks of invalid configurations being placed on the production network. The central configuration also provides for additional configuration bandwidth optimization for the network, by doing a mapping of the APN resources and their initial allocations. Furthermore, the centralized configuration can provide information and warnings to the administrator as to the behavior of the configuration that may not be obvious or intended from the configuration, before loading the configuration onto a production network.

Each of the sites 204-219 and primary NCN site 202 contains an APN appliance to provide APN functionality. The configuration of the APN 200, generally provides for connectivity between a site A, such as site 205, and for a site B, such as site 208, where the connectivity from the site A's perspective is site A→LWL→"WAN"→RWL→site B. The connectivity from the site B's perspective is site B→LWL→"WAN"→RWL→site A. The WAN 201 represents allocated WAN link resources and APN selected paths. In FIG. 2, a conduit between a site A and a site B is formed by use of the conduit sections 222 and 225 and is a virtual connection between the corresponding site A and site B. The conduit includes a collection of paths and encompasses a path from a LWL at site A→"WAN"→RWL at site B.

In one presently preferred embodiment, APN conduits exist between the NCN and, for example, sixteen APN client sites as shown in FIG. 2. It will be recognized that while sixteen APN sites are shown for purposes of illustration, a larger or smaller number of potential APN client sites may be suitably employed. Each APN conduit may have the unique configuration parameters tailored by an administrator for the particular needs of each geographic location associated with a particular APN.

For a definition of APN path states, a description of path processing services is provided below. Any paths currently in a path quality good state are eligible to be chosen first. If multiple paths are in a path quality good state, then an estimated end to end time is evaluated and compared for each path, and the path with the lowest end to end time is chosen. If no path is in a path quality good state, then a path in a path quality bad state with the highest bandwidth is chosen.

FIG. 2 is an exemplary APN 200 with geographically diverse client sites in accordance with an embodiment of the present invention. The exemplary APN 200 is configured with sixteen client sites 204-219, which are generally located remotely from each other. A site would be defined as remote if the devices are physically in different locations such as different buildings, cities, states, time zones or countries. For example, the primary NCN 202 may be located in a company's headquarters location in a first country with client sites 204-209 and client sites 217-219 also located in the first country. The other client sites 210-216 may be located in a second country.

As used herein, an APN appliance is a device that contains APN node functionality according to software modules, such as the control plane module 156 and 158, the WAN ingress processor module 160 and 162, and the WAN egress processor module 164 and 166, as described in more detail above with reference to FIG. 1B. The sixteen client sites 204-219 are coupled by conduit sections 221-236, respectively, and the conduit sections may be connected together to provide a configurable virtual connection between two connected APN appliances at the client sites. It is noted that while sixteen client sites 204-219 are illustrated, an APN may support as many client sites as are required.

A dynamic conduit is a conduit created between APN clients when needed and can be removed when no longer needed, based on a configured first threshold and a configured second threshold. For example, client site 205 can be configured with two local WAN links, one from a first network provider and one from a second network provider. Multiple conduits may be connected to site 205 which may be configured to use one or both of the local WAN links. In an exemplary scenario where all of the conduits that are connected to site 205 use both local WAN links, then when usage for either local WAN link passes a configured second threshold, creation of a dynamic conduit can be triggered as described in further detail below.

The centralized monitor, analysis and management software in accordance with the present invention installed on a server associated with the APN provides several functions which are useful in managing an APN. For example, a monitoring service monitors events data and provides results in a tabular format. A number of additional services are briefly described in this section.

1. APN discovery—a single point identification of all nodes in an adaptive private network (APN) which supports addition and removal of nodes in the APN. A network topology is a listing of nodes and how they connect in the APN. A network configuration is a listing of resources required by the nodes and their connections in the APN, for which some or all of the resources may be specified by a user of the APN. The discovery process automatically learns a new topology of the APN, which may change due to addition or removal of nodes and connections, without relying on the network configuration information. The APN VM discovers the network topology by requesting information concerning the nodes and their connections from the NCN. Network statistics are based on a timeline that a user has selected to examine, without being tied to a particular configuration. If the APN has changed, objects, such as appliances and links, either show up or not show up in the network topology based on the time line that is selected.

2. APN configurability—Configuration changes can be made from APN VM based on latest configuration information obtained from the NCN. The application of the configuration changes are accomplished at the NCN and an updated configuration is activated from the NCN. This process of updating a configuration is separate from the discovery and statistics gathering process as described in more detail herein. Discovery and statistics gathering does not depend upon the current operating configuration. A web-based user interface (UI) is provided which allows the user to build and edit the APN configuration file which describes the APN. Since the APN configuration features change from release to release, it is important for the APN software to be able to know how to build a configuration that is correct for the software that is running, or going to run, on the APN. This capability is provided by having the APN system install an onboard configuration facility package corresponding to a given APNA software release. This onboard configuration facility package is installed with the APN software and the package can be manually updated by the user 3. APN time consistency of the present invention makes gathering of statistics about the APN robust in the face of time changes and time discrepancies across the APN. The APN system uses a strict rule that its view of time is correct and distrusts any APNA views of time. When statistics are received from an APNA, the timestamps in the statistics are remapped to correspond to the APN system's timeline at the server running the APN software of the invention, the APN server.

4. APN map generation—The UI provides support for creating network maps based on the sites and conduits in an APN configuration file. Users are allowed to upload their own map background, choose the sites that appear on the map, and customize the positioning of sites. Multiple maps can be generated from a single APN configuration file. The map functionality of the APN software focuses on placing the network data that the APN system has onto a background provided by the user.

5. APN graphing—Users can create customized sets of graphs based on statistics gathered from the APNAs. These graph sets allow the objects, measured data, and time range to be customized. Graph sets can be added to dashboards and saved for future use. The configuration data is not stored with the monitor data and is not directly used with the graph visualizations.

6. APN reports—Users can create reports that contain tables of data that are aggregated over a time range. The objects, measured data, and time range can be customized. Such reports can be added to dashboards and can be saved for future use. The configuration data is not stored with the monitor data and is not directly used with the report visualizations.

7. APN map monitoring—The network map created with a configuration can be used to monitor an APN. In this mode, the map colors the conduits to indicate the state of the conduits and paths and provides tooltips for the sites and conduits to display detailed statistical data. For example, color coding and line width provide visual cues to network performance. The amount of bandwidth is indicated by the width of a line and the colors indicate a state of a conduit. For example, a conduit illustrated in green indicates the conduit and paths are good, if illustrated in orange indicates the conduit and paths may be operative but in a bad state with relatively high loss rates, and if illustrated in red, indicates a conduit and paths are not usable. A dashed line with alternating colors indicates, for example, that the conduit and paths have different states. Arbitrary points in time can be selected to provide a visual representation of what the map looked like at that point in time. A time stepping mechanism is provided to allow the user to watch how the network has changed over time. The time stepping mechanism can be used to look at a series of data such as the conduit send/receive bandwidth and loss over time. This approach could be thought of similar to viewing a sequence of pictures where the subject matter is changing between picture frames. However, in this case the subject matter is data representing a conduit send/receive bandwidth value or loss counter for a given moment in time. The time stepping mechanism has an option that allows the data to be advanced automatically after every specifiable time, such as 1 second to the next moment in the time series when using the time stepping playback mode. The rate of playback is user configurable to allow the user to control how fast or slow the data moment is advanced. The user could automatically advance to the next 1 minute, 5 minutes, 15 minutes, . . . 24 hours to view a series of conduit send/receive bandwidth data values. The user could also single step forwards or backwards to view the data one moment at a time as well as jump to the first or last moment in time. These maps can be added to dashboards and can be saved for future use. The map visualizations make use of the configuration data to know what sites to display and the placement of the site within the map visualization.

Figure 3A:
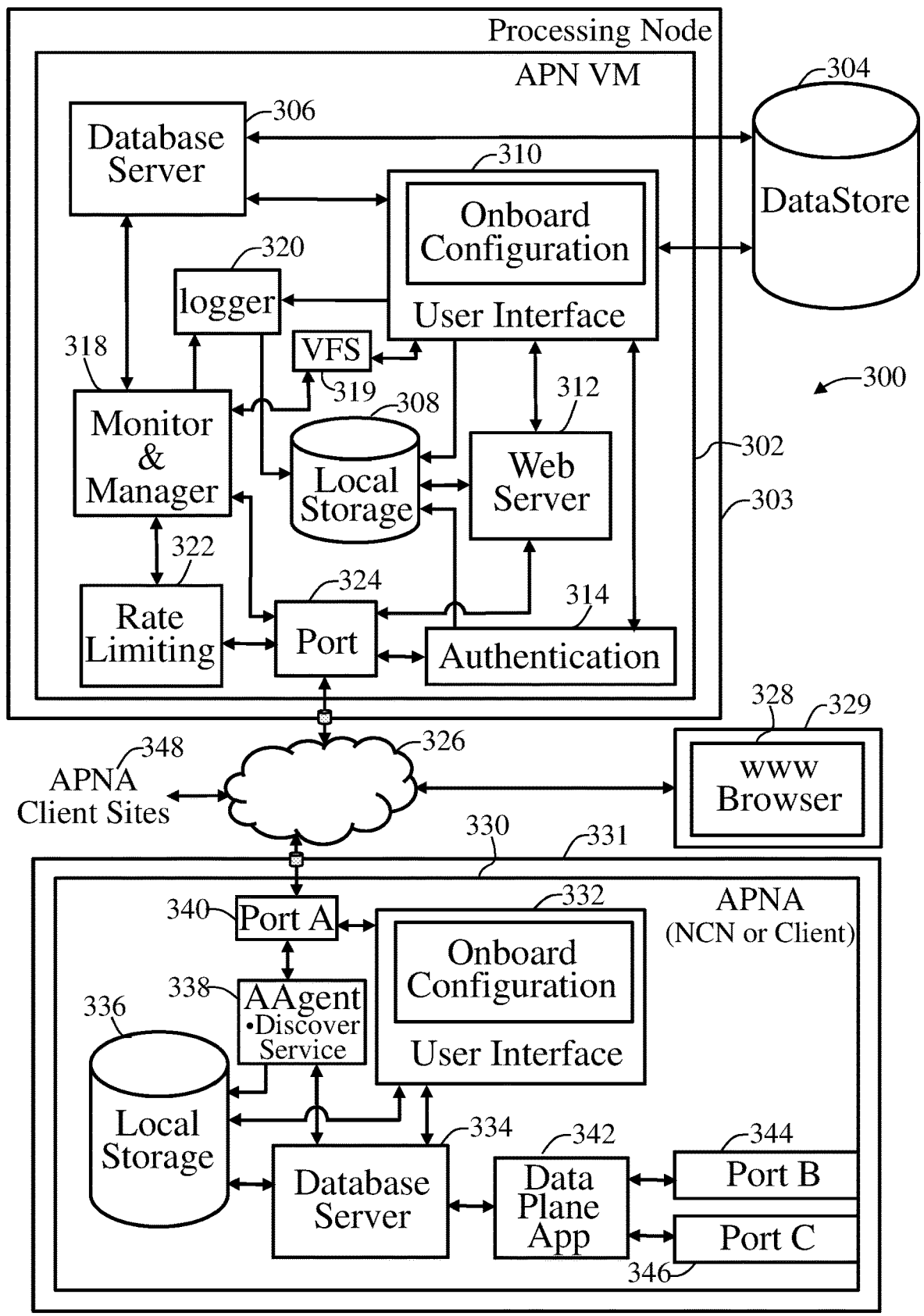
FIG. 3A illustrates an APN centralized management system that monitors, analyzes, and provides discovery, timestamp correlation, and database schema migration processes in accordance with an embodiment of the present invention.

FIG. 3A illustrates an APN centralized management system 300 that monitors, analyzes, and provides discovery, timestamp correlation, and database schema migration processes in accordance with an embodiment of the present invention. The APN centralized management system 300 comprises an APN virtual machine (VM) 302 according to the present invention as described herein and operating in the APN software server, such as a processing node 303, a datastore 304, an APNA 330 operating in a processing device 331, a world wide web (www) browser 328 operating in a processing system 329 which may be remote or locally accessible from the processing node 303 and processing device 329, and a plurality of APNA client sites 348.

In the APN, a network control node (NCN) is connected to the client nodes of the network, such as shown in FIG. 2 where the primary NCN 202 is connected to the sixteen client sites, also referred to as client nodes, 204-219. The APN also uses a management network as a separate logical or physical network that separates user data plane application traffic from management plane traffic. Each of the client nodes provides their management IP address to the NCN. The APN VM is able to use the NCN as a single point of access to obtain the management IP addresses of the clients and then directly poll the client nodes for additional information. In such a configuration, a client node does not have access to any other client's management IP address providing enhanced security for the APN. The APNA 330 may be a client node or, by ensuring security of the APN is not decreased or compromised, an NCN. Also, by ensuring security of the APN is not decreased or compromised, the processing node 303 may be an NCN or a client node of the APN. The centralized management system 300 discovers, via an active NCN, active, standby, and redundant devices during a discovery phase. Once the management IPs are learned, APN VM contacts the clients directly, as part of the discovery process. As part of a polling process, the centralized management system 300 is able to discover the network topology via the active NCN, such as determining which appliances are active in high availability (HA) systems as well as geographically diverse (GEO) sites.

The APN VM 302 includes a plurality of components including a database server 306, a local storage 308, an APN VM user interface (UI) 310, a web server 312, an authentication function 314, a monitor and manager 318, a virtual file system (VFS) 319, a logger 320, a rate limiting function 322, and a port driver 324. The port driver 324 connects to a hardware interface such as an Ethernet interface to a network 326, such as a management network. For security reasons, the same interface used to communicate with the appliances is also the interface used to access the APN software from the processing device 329 to prevent a backdoor into the network. A management network is a separate logical or physical network that separates user data plane application traffic from management plane traffic. The management network as used herein could be thought of as a private management network.

The APNA 330 comprises a plurality of components including an APNA UI 332, an APNA database server 334, an APNA local storage unit 336, a local server identified as an appliance agent (AAgent) 338, a port A driver 340 which is the management network interface port on the appliance, and a data plane application (app) 342, a port B driver 344, and a port C driver 346. The data plane app 342 is an executable program which performs all communication processing of latency, loss, and jitter calculations on packets received and transmitted on the APNA, such as NCN clock synchronization packets and data communication packets. On a periodic basis, in response to a poll from the APN VM 302, such as every minute, the data plane app 342 updates the APNA database server 334 with statistics about the traffic processed over that minute for storage in the APNA local storage 336. Upon request from the monitor and manager 318 on the APN VM 302, the AAgent 338 gathers statistics from the APNA database server 334 or from the APNA local storage 336. The AAgent 338 packages up the gathered statistics into a report package file and sends the report, using the port A driver 340, through the management network 326, to the monitor and manager 318. The monitor and manager 318 unpacks the report package and sends the unpacked data to the database server 306 for storage in the datastore 304.

On the APNA that operates as a network control node (NCN), such as APNA 330, a discovery service is provided by the AAgent 338 for use by APN VM 302. A user may use the discovery service to configure APN VM 302 by use of the management Internet protocol (IP) address of the NCN. The APN VM 302 uses the NCN management IP address to access the discovery service and obtain the complete list of APNAs in the network.

The APN VM 302 may suitably operate as a virtual machine on a hypervisor, such as VMware ESXi. The APN VM 302 stores and accesses statistics, information associated with network maps, and configuration data associated with the APNA 330 and APNA client sites 348 in the datastore 304. While the datastore 304 is shown outside of the APN VM 302, the APN centralized monitor, analysis and management system is not so limited. The location of the datastore 304 is configurable by a user. A base operating system, application software, and operation logs are stored in the local storage 308. A logger 320 records logs of operating events and takes care of rotating and pruning log files. A port driver 324, provides a communication interface such as an Ethernet interface, coupled between the APN VM 302 and the management network 326. A user may use a web browser 328 connected to the management network 326 to access the APN VM UI 310. The management network 326 is also connected to APNA client sites 348 and APNA 330 by means of management ports, such as port A driver 340. The network monitor portion of the monitor and manager 318 communicates with the AAgent 338 component of the APNA 330 and other agent components of the APNA client sites 348 to gather data and perform operations on the plurality of APNAs. The monitor and manager 318 uses a virtual file system (VFS) 319 to accept requests and communicate status to the rest of the user interface.

As an example, in a particular customer installation, an administrator installs the APN VM 302 on a processing node 303 running a hypervisor, such as VMWare ESXi 5.1, that, for example was already available on the customer's system. The administrator of the network uses the VM ware login facilities of the processing node 303 to determine the IP address of the APN VM instance, allocated by use of a dynamic host configuration protocol (DHCP) or uses a command line tool to set the IP address of the APN VM 302. The administrator then logins to the APN VM UI 310 with a web browser 328 and adds himself and other administrators as users of the APN VM 302. The administrator configures the domain name system (DNS), network time protocol (NTP), and time zone settings. The administrator instructs the APN VM 302 about the APN by configuring the IP address of the NCN, downloads security credentials certificates from the APN VM 302 and installs them on the NCN. The NCN automatically pushes those security credentials to all appliances in the APN. The APN VM 302 connects to the NCN, discovers the management IP addresses of all of the clients in the APN, connects to each of those appliances, and then displays to the administrator information about each appliance in the network, the APNA 330 and the APNA client sites 348. This information may suitably include the name of the appliance, management IP address, model number, serial number, software revision, registry timestamp, connectivity information, and polling status. A user enables polling of the network on the APN VM UI 310 and the APN VM 302 starts gathering statistics, starting with the earliest statistics available on the APNAs. The user does not need to set the polling period as a suitable default value, such as five minutes, is automatically used. The APN VM 302 displays graphs quickly from when the APN sites were initially installed and within two hours, for example, statistics from all of the appliances for an entire two week period are available in APN VM 302. The APN VM 302 systematically collects statistics starting with the oldest data and working towards the newest. The data is gathered at a specified pace so as not to cause performance problems on the management network or the APNAs using rate limiting module 322.

When an additional site is added to the APN using the onboard configuration component of the APN VM UI 310 on the APN VM 302, the new site is learned dynamically once the configuration is exported to the currently running NCN 330. The new site will be learned dynamically by the monitoring process if the site is added by the onboard configuration component of the NCN 330. The onboard configuration facility and the discovery and monitoring process are separate functions. The configuration facility does not contain the IP addresses of the sites that are being monitored. A "site" is added to the configuration, but in the process to add the site, the site's management IP address is not required for the configuration file. The monitoring process learns when a new site is added or removed from the network.

The administrator is able to use the APN VM 302 to create a new configuration with the new site and audit this new configuration for errors prior to exporting the newly created configuration with the new site to the NCN 330 for installation on the NCN. The administrator is also able to use the APN VM 302 to specify a link which opens a change management screen on the NCN to allow the administrator to activate the new configuration. Upon applying the new configuration to the APN, the APN VM 302 automatically detects, learns, that a new appliance has appeared on the APN through its monitoring process. The discovery process of FIG. 7 has a timer that triggers the learning of the APN topology at the next discovery interval.

The APN VM 302 then discovers the management IP address of the new site and adds the new site to the list of appliances in the APN as monitored, analyzed, and managed by the APN VM 302. After the APN VM 302 exports the new configuration with the added site, the NCN automatically pushes the security credentials to the new site. The APN VM 302 checks periodically in the background for network additions or removals and polls for statistics from the appliances. The discovery process detects appliances added or removed.

Figure 3B:
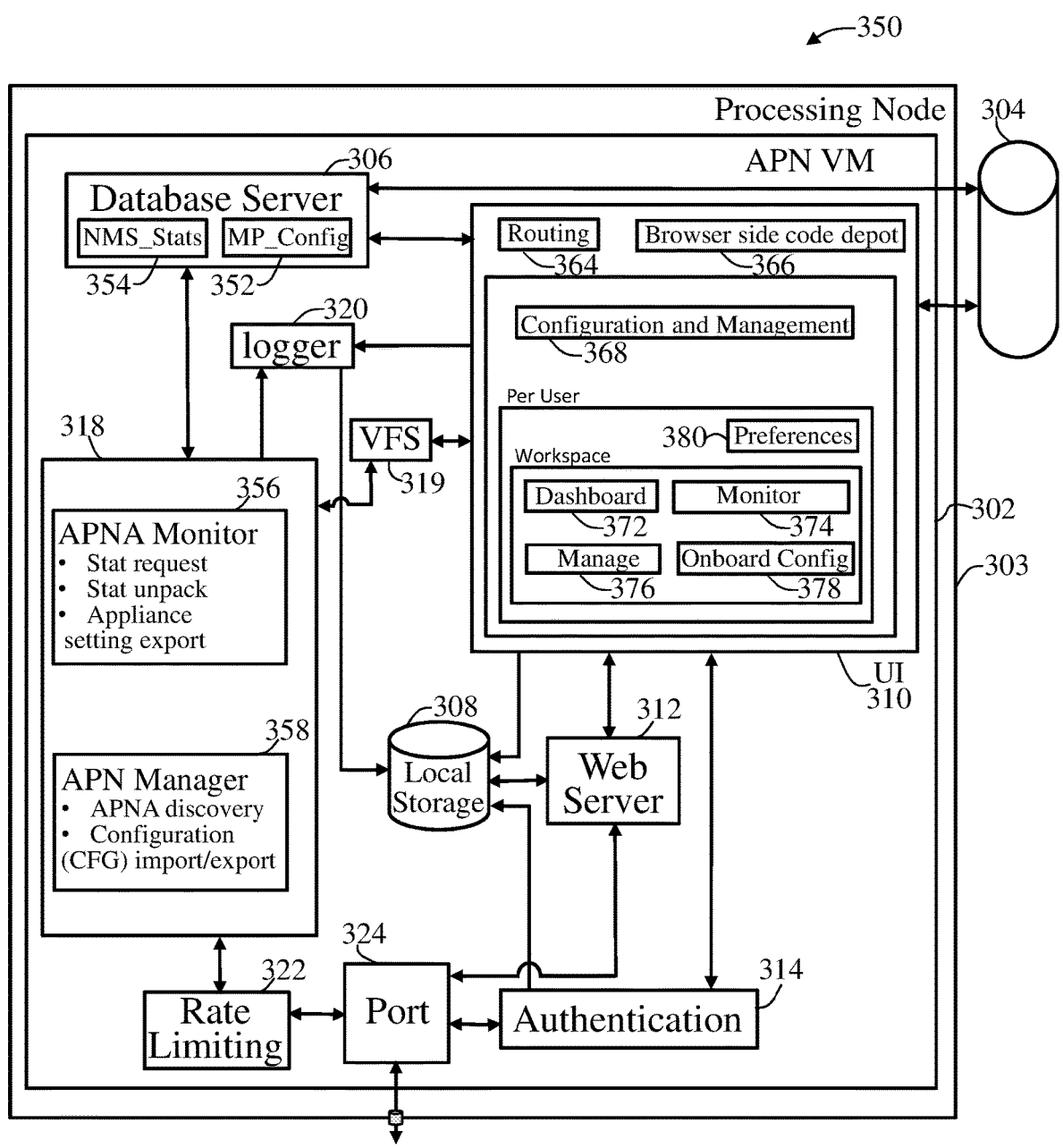
FIG. 3B illustrates internal APN architecture elements in accordance with an embodiment of the present invention.

FIG. 3B illustrates internal APN architecture elements 350 in accordance with an embodiment of the present invention. The APN VM UI 310 stores user session information in local storage 308 and stores configuration files and network maps in the datastore 304. The database server component 306 comprises a management plane (MP) configuration (MP_Config) database file server utility 352 and a network management system (NMS) statistics (stats) file server utility 354 associated with corresponding databases in the datastore 304. The MP_Config file database server utility 352 accesses a MP_Config database in the datastore 304 that contains data related to the APN VM UI 310 and the monitoring and management of APNAs as provided by the monitor and manager 318. The monitor and manager 318 comprises an adaptive private network appliance (APNA) monitor 356 and an APN manager 358. The APNA monitor 356 periodically polls information from the APNA, NCN, or Client 330. The APNA monitor 356 includes capability to generate a statistics (stats) request and unpack a response to the stats request. The APNA monitor 356 also includes capability to export appliance settings to the NCN and one or more client appliances. Export in this context means transmitting appliance specific settings to individual appliances and applying those settings on the appliance. The routing block 364, provides a way to tie requests from web URLs to appropriate functional blocks that resides on the server's back end. The browser side code depot 366 provides code that runs within a user's web browser providing live updates, interactivity and input validation. The configuration and management box 368 is configured to provide settings for the APN manager 358 such as poll interval, NCN IP, and bandwidth limit. The workspace comprising preferences 380, dashboard 372, monitor 374, manager 376, and onboard configuration 378 are constructs which allow a user to organize a set of objects, allowing the user to save and recreate a state of a management session.

The APN manager 358 includes support for managing an APN discovery service which interacts with agents on an active NCN, such as AAgent 338 of FIG. 3A. The APN manager 358 includes the capability to import and export configuration information between the APN VM 302 and the active NCN. The APN manager 358 also downloads the active configuration file from clients which normally should be the same as the ones listed by the active NCN, unless a client cannot communicate with the active NCN via the WAN but the APN VM can connect to the client by means of the management network. The APN VM UI 310 maintains current and previous user settings, workspaces, and dashboards in the MP_Config database file server utility 352 or the database server 306.

The NMS statistics file server utility 354 accesses a NMS_Stats database in the datastore 304 that contains the statistical data gathered from the APNAs. The NMS_Stats database has tables for each type of object, such as specified below. By a specified convention, for each <object type>, a set of tables is specified, including: <object type>s, <object type>_minutes, and <object_type>_hours. The <object type>s table contains the names and id numbers for the objects. The <object type>_minutes tables contain the minute samples for the objects. Each row in an <object type>_minute table contains an object_id which corresponds to an id in the <object type>s table. Each row in an <object type>_minute table also contains an update_epoch_time_s column which reflects the network management system (NMS) time at the time the minute sample was taken on the appliance and generally not when statistics are gathered. The rest of the columns in the row reflect the counts of the data for the event that is being tracked for that minute. The count values are for that minute only and not a cumulative total since the start of the tracking. The <object type>_hours table is similar to <object type>_minutes except that it aggregates an hour's worth of data from the <object type>_minutes table into a single row. This approach improves the APN VM UI 310 performance in cases where data across a large span of time needs to be aggregated. For example, performance of data transfers can be captured by tracking packets in each direction as they traverse every path of the WAN without using probes or injecting test data. An hour row in the <object type>_hours table represents data from the top of the hour to the end of that hour, for example, from the first <object type>_minutes row whose update_epoch_time_s is after 1:00 to the latest <object type>_minutes row whose update_epoch_time_s is before 2:00. A column in the <object type>_hours row shows how many minute samples are represented in that row. It is legal to have <object type>_hours rows with less than 60 minute samples since for the given hour the system may not have been collecting data for the entire hour, such as an hour interrupted by the data plane_app 342 being disabled. It is also legal to have more than 60 minute samples, such as may occur in high availability (HA) systems that switchover to a backup processor device and have an overlap of minutes from both processor devices or as a result of a time change.

Table 1 shows the expected size of the NMS_Stats database for networks of various sizes. A product definition specifies that 1 year of data in 2 TB of storage is requested to be supported. For customer networks in the field, these numbers show that the APN system, such as the APN centralized management system 300, can easily support that. For the largest networks, the data may exceed a 1 TB limit.

Figure 4:
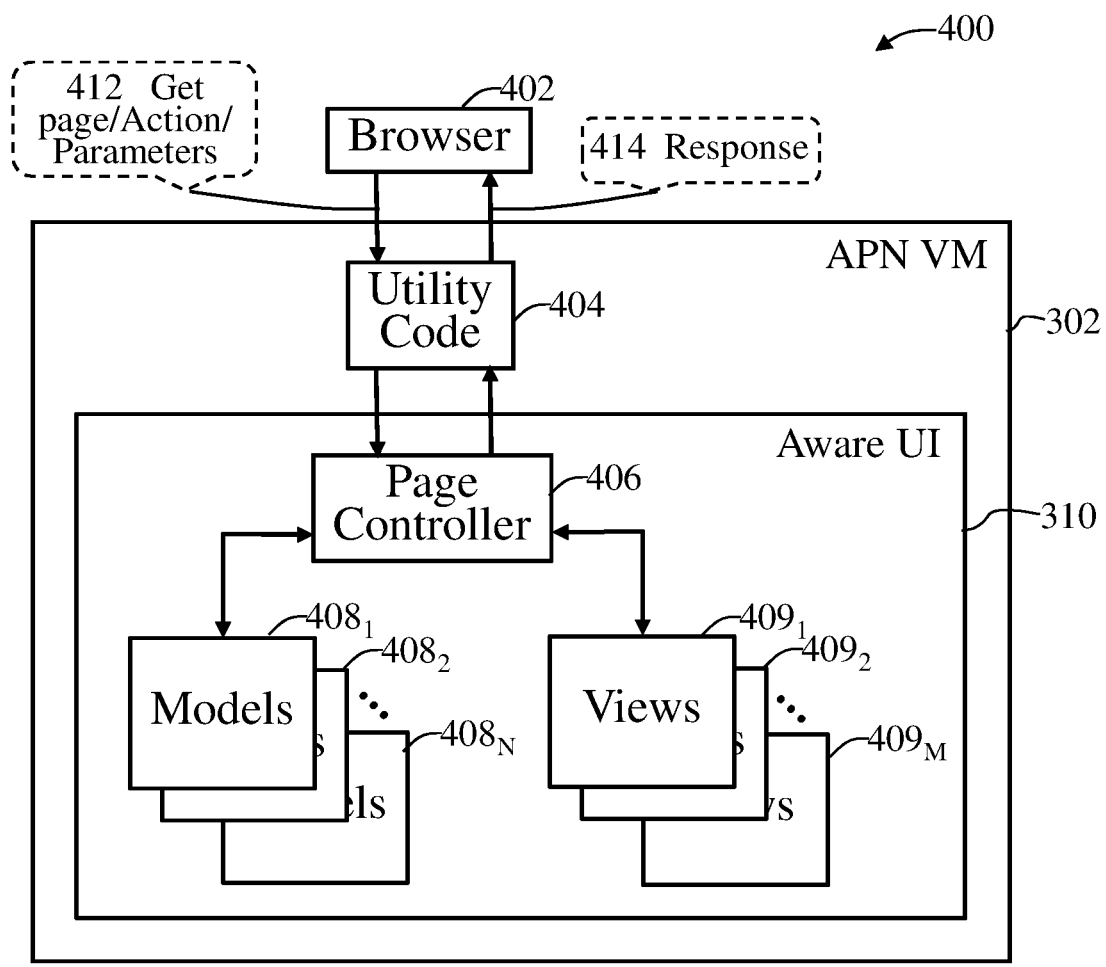
FIG. 4 illustrates an APN VM user interface (UI) request response flow in accordance with an embodiment of the present invention.

FIG. 4 illustrates an APN VM user interface (UI) request response flow 400 in accordance with an embodiment of the present invention. The APN VM system uses a web based user interface and in web applications, a web browser updates its view only based on a request to the server that holds the model view. In this web based environment, changes to the model view cannot be automatically pushed to the user interface and as a result the APN VM system regularly polls for updates and makes requests for updates as appropriate.

TABLE 1

Database size estimates

| Number of Client Sites | Number of Internet WAN Links | Number of Intranet WAN Links | Number of Conduits Per Site | DB size in 1 year (MB) |
|---|---|---|---|---|
| 128 | 3 | 1 | 8 | 1,340,375 |
| 128 | 3 | 1 | 16 | 2,457,726 |
| 100 | 3 | 1 | 3 | 501,717 |
| 40 | 3 | 1 | 3 | 201,043 |
| 256 | 3 | 1 | 8 | 2,680,157 |
| 256 | 3 | 1 | 16 | 4,914,859 |

When the web browser 402 tries to access the uniform resource locator (URL), utility code 404 parses the URL and determines which web page controller 406 should receive the request and what the action should be. A web page controller is considered one of the process application statistic thread instances 406. For example, an http GET request on dashboard/view/1 results in the view action being called on dashboardController with the parameter value of "1". When the selected web page controller receives the request, it responds to the request and calls an appropriate view $409_1$, $409_2$, ... $409_M$ to render a response. Dashboard is a "type", page one is an "instance", and it is possible to have multiple dashboards. Typically, handling the request involves dealing with one or more models $408_1$, $408_2$, ..., $408_N$. These models control access to how data is stored in a database in accordance with the present invention and manipulated. For example the dashboard/view/1 request would use a dashboard model, which provides access to a data server database which holds the dashboard settings. The dashboard model provides a way to lookup the dashboard information based on a dashboard ID which is 1 in this example. After processing a lookup and setting variables as required to store the results of the lookup, the "view" is rendered by calling a dashboard/view file. In this example, the utility code 404 implicitly renders the page, but, depending on implementation, the utility code 404 would be explicitly called by the page controller 406 to render a view.

A web page controller 406 often interacts with several models to deal with the data related to the request and typically selects one view to use and render the requested data. In different APN systems, the number of models each web page controller uses and the number of views that a selected web page controller might use can vary between the different APN systems. The data flow in the APN VM UI 310 includes significant scripting within the browser. This scripting is used for many reasons including polling of data to provide live updates, improve interactivity, and validate the input. When a view renders a page, it provides a template to the browser JavaScript that is necessary for the proper operation of the page.

Figure 5:
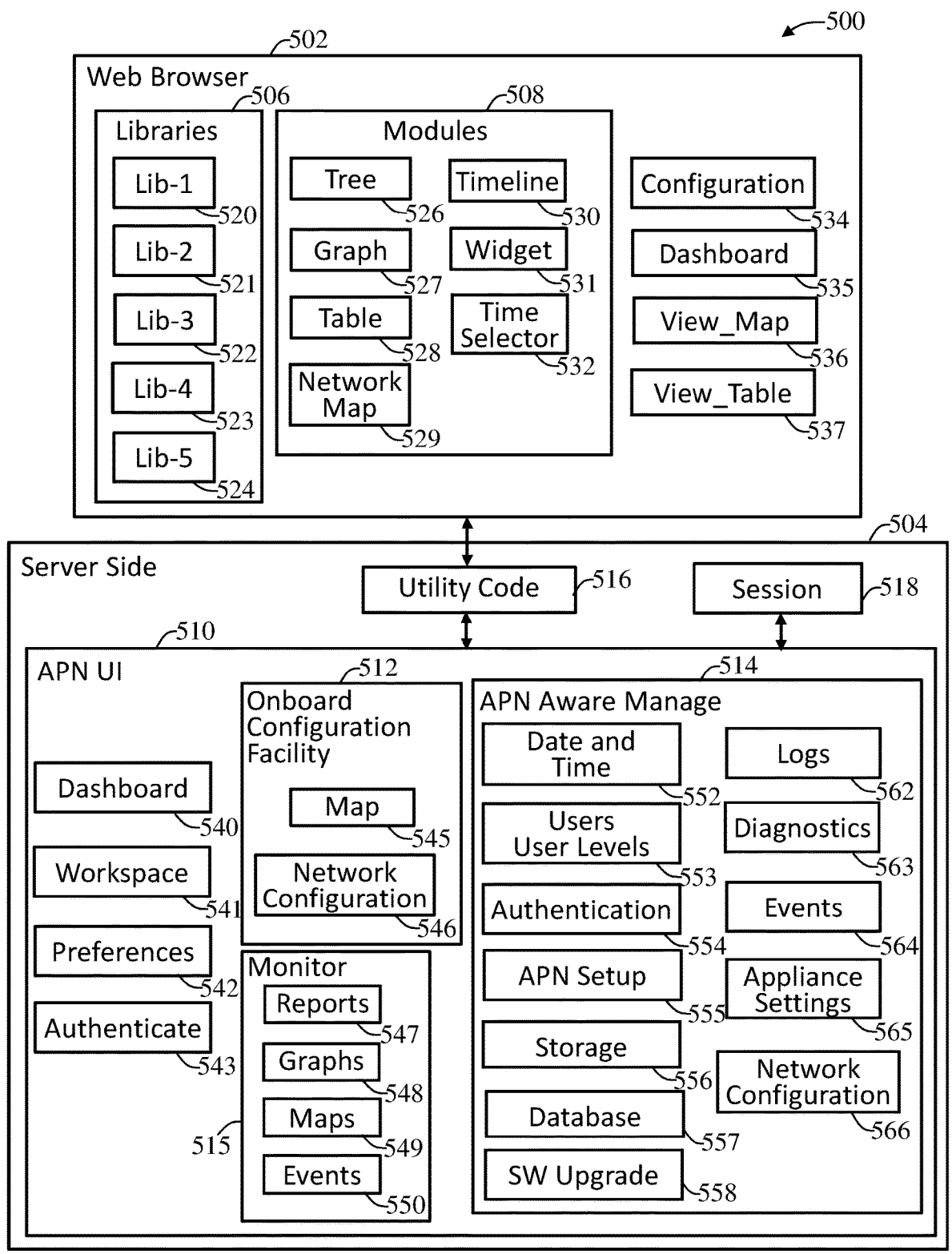
FIG. 5 illustrates major functional blocks of an APN VM UI in accordance with an embodiment of the present invention.

FIG. 5 shows major functional blocks of an APN VM UI 500 in accordance with an embodiment of the present invention. FIG. 5 divides the APN VM UI 500 into a server side 504 which runs within an APN VM and a browser side 502 which runs as JavaScript within a user's web browser.

On the server side 504, utility code 516 is used which is responsible for receiving web requests, translating the URL into a controller to handle the request, the name of the method within the controller which should handle the request and any parameters which should be passed to the method. The utility code 516 also provides libraries of code, such as XML, model, view, and controller code that the APN UI code 510 uses.

The APN UI code 510 when executed on the server implements the backend of UI logic. Each of the functional blocks, 540-543, implements a controller, one or more models, and one or more views. The Workspace functional block 541 is responsible for creating and managing all workspaces. Each user is allowed multiple workspaces and each workspace can be exported so that other users can import them. The dashboard functional block 540 allows users to create and manage dashboards within a workspace. The Authenticate functional block 543 provides an interface to an authentication module, such as the pluggable authentication module (PAM) subsystem in Linux, which provides a suitable way to verify a user's identity. The Authenticate functional block 543 is called when a user tries to log into the APN VM.

The APN Manage group 514 contains the following functional blocks.

Date and Time 552—This function allows users to manually set the timezone, date, and time of the APN VM. It also allows users to configure a network time protocol (NTP) server to sync the date and time of the APN VM. However, this time synchronization is not the same as the NCN time synchronization of the APNAs.

Users 553—This function allows local users to be added to and deleted from the APN VM. Users 553 also allows management of levels of users, which currently are administrative users and guest users, with their own access privileges to access the APN VM UI.

Authentication 554—This function configures a remote access dial in user service (Radius) and terminal access controller access-control system plus (TACACS+) servers. The APN VM 302 authenticates users by use of these servers. If an authentication to the remote servers fails, then the APN VM attempts to authenticate locally.

APN Setup 555—This function allows the user to specify the IP address of the active network control node (NCN) of an APN so that the APN VM 302 can discover all of the appliances in the network, the APNAs. APN Setup 555 also allows the polling of stats from appliances to be controlled. Polling of individual appliances can be enabled and disabled. The user can also control polling of the APN as a whole. The authentication credentials certificates to access the APN are also configured here.

Storage 556—This function allows users to specify disks to use for storing the large amount of data that the APN VM is able to collect. Data can be migrated to another storage location, if it becomes necessary. The user can pick from disks attached to the APN VM or to remote file systems available over the network.

Database 557—This function provides the ability to manage the statistics database 354 of FIG. 3B. Users can specify how much data should be stored and provide a way to manually purge data from the database.

SW Upgrade 558—This function allows the user to upload a new APN VM software package and install it. Any migration of databases that is necessary for the new software to run happens automatically at install time.

Logs 562—This function allows users to view and download the APN VM logs.

Diagnostics 563—This function allows diagnostic dumps to be created, downloaded, deleted, and uploaded to a remote file transfer protocol (FTP) server.

Events 564—This function provides an interface where users can view events generated by the APNAs or the APN VM system. Events 564 also provides an interface to setup alerts about events to be delivered to users. Event delivery can be done through email (SMTP), SNMP traps, and syslog.

Appliance Settings 565—This function allows the user to configure and distribute appliance settings to a user selectable set of appliances that are currently being managed by the APN VM system.

Network Configuration 566—This function controls the network settings of the APN VM. The Network Configuration 566 sets the management IP address, netmask, gateway, and DNS servers.

The onboard configuration facility group 512 is a plugin that can be installed into APN VM system to provide a web based network configuration utility and a network map. The network configuration block 546 provides a tree based view of the APN configuration and interfaces to a compiler to perform audits and to update the tree based on automatically generated objects. The map block 545 works with the network configuration block 546 to allow sites in the network configuration to be placed on a map. The map block 545 also allows for navigation in the network configuration tree based on selection of nodes in the map. The components of the onboard configuration facility group 512 allow a configuration package to be created and sent to the NCN, allowing the NCN to send a specific personalized configuration to the clients.

The monitor group 515 provides functional blocks which allow a user to view a historical state of the adaptive private network (APN). The reports function 547 provides a tabular view of the data over a range of time selectable by the user. The graphs function 548 provides a graph wizard which allows a user to select data on particular objects to view. Graphs created by this function can be saved to a dashboard. The map function 549 in this context correlates and shows data from the statistics database NMS_Stats 354 of FIG. 3B to a map that was created in the onboard configuration facility 512. The map function 549 shows the state of the APN at points in time and provides tooltips with more detailed statistical information.

The session function 518 is used to store session information. When users login to the web APN VM UI 500, a session is created and a cookie is sent back to the browser. The browser sends that cookie back to the APN VM 302 on every request. The cookie that is sent by the browser is used by the session function 518 to obtain a relevant session record. That session information is automatically made available to all of the APN UI code 510 on the server operating on the APN VM 302.

FIG. 5 also shows the functional blocks that run on the browser side 502. While these blocks run on within a user's web browser, they are sent to the client by the server side 504. These blocks are implemented in JavaScript because that is a programming language that can be run by web browsers.

The software blocks in the library (libs) group 506 are third party libraries available for use by the server side 504 of the APN VM UI 500.

Lib-1, is a code library, such as highcharts, that generates graphs on the client side. The code modules 508 are custom created to provide the data for the graph in a specified notation, such as in JavaScript object notation (JSON) format, and highcharts renders a display of a graph according to parameters that are configured for the graph.

Lib-2 is a code library, such as the Massachusetts Institute of Technology (MIT) JavaScript library jQuery, that aids in the development of interactive web pages.

Lib-3 is a statistics code library, such as Berkeley Software Distribution (BSD) Datatables, that is a plugin to jQuery and provides implementation of tables that are used to display statistics of an APN.

Lib-4 is a library of support tools, such as MIT's Easeljs, that aids working with graphics enabling easier use of hypertext markup language version 5 (HTML5) canvas element. Lib-4 is used to build the network map.

Lib-5 is a library of support tools, such as MIT's Sugarjs, that provides utility functions which make programming in JavaScript easier.

The software blocks in the module group 508 are generic components custom created for use across various pages. The module group 508 includes graphs 527, network maps 529, trees 526, timelines 530, time selectors 532, tables 528, and widgets 531 that are used in many of the pages.

The rest of the functional blocks, including configuration 534, dashboard 535, view_map 536, and view_table 537, on the web browser side 502 are tied to functional blocks on the server side 504.

Configuration 534—is a functional block that comes as part of the onboard configuration facility 512, described above, and supports the onboard configuration facility components on the server side. The configuration 534 brings together the tree and network map modules 526 and 529, respectively, along with additional logic to handle changes to a configuration.

Dashboard 535 is a functional block that interacts with the server-side dashboard block 540 and uses the widget module 531 to display configured dashboard elements, such as Reports, Graphs, and Maps, for example.

View_table 537 is a functional block that interacts with the server-side monitor reports 547 and brings together the graph 527, table 528, timeline 530, and timeselector 532 modules to display tables of statistics.

View_map 536 is a functional block that interacts with the server side Monitor Map function 549 and brings together the network_map 529, timeline 530, and timeselector 532 modules to display statistics and network status on a network map.

The adaptive private network (APN) manager 358 of FIG. 3B is responsible for all communications with the APNAs that the APN VM system is managing. The APN VM UI 310 can make the following requests to the APN manager 358, including:

Set management IP addresses of client nodes on an APN obtained from the NCN, as a single point of access for this information, in support of the APNA discovery and configuration import/export services. Configurations can be imported from an active NCN or from a local computer. Configurations can also be exported from APN VM to an active NCN or to a local computer. Such information may be set in response to a pop up dialog box asking for input from a user.

Set authentication credentials on the APN in support of exporting configuration information and polling data. This is part of the initial setup before discovery is done, such as at block 706 of FIG. 7, discussed in more detail below.

Test connectivity to the NCNs in support of an APNA discovery.

Set the statistic polling interval for an APN to control the frequency of gathering data from appliances in the APN.

Set the polling rate for each polling interval for an APN to control the data load on the management network used for polling data.

Enable/disable statistic polling for an APN to provide administrative control of statistics polling, for example.

Enable/disable statistic polling for a specific APNA site to provide administrative control of statistics polling, for example.

Discover appliances on an APN to provide administrative control of polling, for example.

Download configuration files or packages from a configuration database on APN VM to a local computer.

Download an active or previous configuration from an APNA to a local computer through the APN VM.

Download an onboard configuration facility from the APN VM 302 to a local PC.

Upload appliance settings file from a local PC to the APN VM 302.

Export appliance settings file from APN VM 302 to APNAs

When statistic polling is enabled for an APNA, the APN manager 358 requests stats from all of the appliances of the APN at the requested poll interval. A stats package is downloaded from each appliance in the network in response to the request to gather statistics and have the stats placed into the NMS_Stats database in datastore 304 under control of the NMS stats utility 354. The stats package and how it is processed is described in further detail below.

The APN manager 358 periodically polls the appliances in the network for information and updates the MP_Config database with the information that is gathered. This provides the APN VM UI 310 with updated information about which software versions are running on the APN, which appliances in a high availability (HA) configuration are active, and which appliance is serving as the active NCN for geo-diverse NCN configurations, for example.

The APN manager 358 uses a virtual file system (VFS) 319 as shown in FIGS. 3A and 3B to accept requests and communicate status to the rest of the user interface. Such a virtual file system 319 may be created by use of a VFS software module, such as a file system in user space (FUSE) module, for example. Requests that come in through the VFS 319 are directed to the APN manager 358. The APN VM UI 310 queries the database server 306 to access data from the selected database in the datastore 304 to render the user interface.

To communicate with appliances, the APN manager 358 utilizes a middleware layer of software that provides a framework to build applications using remote procedure calls (RPCs). Such a middleware layer of software may be a software package such as Apache Thrift™, also referred to more simply as Thrift, which is an open-source middleware software hosted by developer Apache Software Foundation.

Thrift, or an alternate middleware layer of software of similar capabilities, provides an interface that allows the APN manager 358 to send messages to and get responses from APN appliances (APNAs) with simple function calls. Such a Thrift interface or a Thrift-like interface is specified to support use of a secure sockets layer (SSL) cryptographic protocol as a transport mechanism so that all traffic over the management network 326 is encrypted.

The Thrift interface or Thrift-like interface is defined to support compatibility between the Thrift client and the Thrift server when the interface definition changes. For example, new members of structures and new parameters for methods can be defined without requiring both the client and server to be upgraded nearly simultaneously. This allows the APN VM software releases to be kept separate from APNA releases.

The APNAs each implement a Thrift server function locally and the appliance agent (AAgent) 338, uses the Thrift interface or Thrift-like interface. Each APNA software release has a file which defines the interface to APNAs running that release. The APNA software releases update the file in such a way that an APN VM release that can talk with an older APNA software revision is also able to talk with the new APNA software. The APN VM software release, in general, always includes the latest Thrift file or Thrift-like file from the latest APNA software release.

The APN manager 358 creates a virtual file system using FUSE or a VFS software module and specifies a path address to a server where the virtual file system is located. When the APN VM UI 310 needs to request an action from the APN manager 358, the APN VM UI 310 writes a value into the appropriate VFS file. For example, informing the APN manager 358 of the management IP address of the NCN is done by writing the IP address to the VFS file.

This approach provides a very simple interface that anything from shell scripts to compiled code can use to interface to the APN manager 358.

To discover the APN, APN VM 302 uses Thrift to connect to the IP address that the user configured as the NCN address and issues the get_network_mgt_ip_addresses function call, which is one of the Thrift or Thrift-like function calls. This function is defined as:

list<ApplianceMgtIPInfo>get_network_mgt_ip_addresses( ) throws (1: not_authenticated nologin)

This returns a list of ApplianceMgtIPInfo structures. Each structure for an APNA is defined as:

```
struct ApplianceMgtIPInfo {
    1: string site_name,
    2: i32 appliance_id,
    3: string mgt_ip_addr
}
```

This structure contains the name of the APNA site, the appliance ID, which specifies whether it is a primary NCN or a secondary NCN in a high availability (HA) pair, and the IP address of the APNA site. A secondary NCN is a geographically different client that can become the NCN if the primary dies, for example. The APN can be configured with an HA pair at a primary NCN site and a HA pair at a secondary NCN site. In this case, the secondary NCN site becomes the NCN when the primary NCN site, including both the active and standby HA pair, went down. At the secondary Site, there's also an active and standby appliance. So there are four appliances that may become the active NCN. The NCN receives this information from each APNA site in the APN using an APN Mem shared memory mechanism as described in U.S. Pat. Nos. 8,775,547 and 8,452,846 entitled "Adaptive Private Network Asynchronous Distributed Shared Memory Services". Specifically, regarding U.S. Pat. No. 8,452,846, see FIGS. 2A, 2B, 3, 4A-4D, 5A, and 5B, and associated description at col. 9, line 60 to col. 21, line 28 and at col. 21, line 57 to col. 24, line 8. Also, regarding high availability networks, see FIG. 6, and associated description at col. 21, lines 29-56. When a discovery 30 minute timer expires, a query is issued to the NCN using this api:

list<ApplianceMgtIPInfo>
get_network_mgt_ip_addresses( ) throws (1: not_authenticated nologin)

Once the list of appliances is obtained, then stats are retrieved from the listed appliances, since the NCN has the list of management IP which each appliance sends to the NCN in a clients_to_NCN_shared_MEM_table_entry, as also described in further detail below. Users are also allowed to discover manually by activating a button on the APN discovery page if they don't want to wait for the timer.

Each APNA client pushes a clients_to_NCN_shared_MEM_table_entry structure to the NCN over a connecting conduit. This process may be configured to run at specific intervals, such as once a minute, in support of system operations. This table structure is defined as:

```
typedef struct clients_to_ncn_shared_mem_table_entry_s
{
    ipv4_addr    management_ip_addr;
    char         sw_version[50];
    char         hw_model[25];
    u_int8_t     appliance_id; /* The appliance id of the sender of this message */
    u_int8_t     HA_appliance_id; /* The appliance id of the HA peer (if this site is HA) or 0xff if not */
    ipv4_addr    HA_management_ip_addr; /* The management IP of the HA peer */
} __attribute__((packed)) CLIENTS_TO_NCN_SHARED_MEM_TABLE_ENTRY;
```

The standby HA appliance also pushes this structure to the active HA appliance. This gives the NCN the management IP addresses of every APNA in the network and the NCN uses this information to fulfill the get_network_mgt_ip_addresses request as used in the discovery process.

After APN VM 302 receives the list of ApplianceMgtIP-Info structures, the APN VM 302 adds this information into a managed_appliances table of the MP_Config database. It then cycles through all of the APNAs and tries to connect to them to get more information through the get_appliance_info Thrift or Thrift-like function call. This function is specified as:

ApplianceInfo get_appliance_info( ) throws (1:not_authenticated nologin) and the ApplianceInfo structure is defined as:

```
struct ApplianceInfo {
    1: string sw_revision, /* software version is displayed on the APN discovery page */
    2: bool service_enabled, /* If the service is disabled, the below fields may not be reliable
*/
    3: string site_name, /* NCN or client site's name */
    4: i32 appliance_id, /* This appliance id a 1 means it is the secondary appliance at that
site */
    5: string appliance_name, /* Appliance name at a site is from the configuration */
    6: bool is_client, /* Based on whether this site is currently a client */
    7: bool is_active_ncn, /* Does this appliance consider itself the active NCN */
    8: bool is_ha_forwarding, /* If a site has an HA appliance, the appliance id=1, then HA
forwarding is enabled if the appliance is active */
    9: i64 registry_timestamp, */ When config. is compiled, this is shown on the APN
discovery page */
    10: bool maybe_ncn, /* True if this appliance could become an active NCN */
    11: list<string> remote_site_list, /* The site names that this site has conduits to */
    12: string model, /* appliance hardware model is displayed on the APN discovery page */
    13: string serial_number, /* appliance hardware serial number is displayed on the APN
discovery page */
    14: string bios_version, */Items 14-22 are information about the appliance displayed
under Monitor->APN Inventory page */
    15: string bmc_version,
    16: string active_os,
    17: string backup_os,
    18: i64 seconds from last memory dump,
    19: i32 memory size in GB,
    20: string HDD type,
    21: i32 HDD size in GB,
    22: string HDD model
    23: string license_capacity
}
```

Selected parameters are used to populate columns in the managed_appliances table of the MP_Config database.

In addition to using SSL in communications between APN VM and APNAs, there are several other steps taken to provide security when talking to appliances. The appliance agent (AAgent) 338 on an APNA requires APN VM 302 to authenticate before the AAgent 338 is able to accept any requests. This authentication is done using shared keys, described in further detail below, instead of user names and passwords. The use of user names and passwords requires the names and passwords to be stored on APN VM 302, which may be a security concern. Even obfuscating the passwords on APN VM 302 may be insecure since logic to un-obfuscate the passwords would be stored on the same disk as the passwords. It is not possible to use a challenge-response protocol between APN VM and an APNA with passwords because the APNA may need to authenticate the user with RADIUS or TACACS+ and that requires the APNA to be able to get to the plain text password.

Authentication between the APN VM 302 and each APNA is done with a shared key mode that uses public-key cryptography. In this mode, the APN VM creates at install time a private key and a public certificate. The public certificate contains a public key that corresponds to the private key. The user downloads the public key from the APN VM 302 and installs it onto each of the APNAs. With this setup, the APN VM 302 uses the private key when creating the SSL connection to the APNA. The APNA verifies that the key being used corresponds to the public certificate that it possesses and allows the SSL connection to be made. If an incorrect key is used, the SSL connection is terminated. An advantage of this security method is that the complexities of making sure encryption is done correctly is accomplished by libraries associated with SSL, such as the OpenSSL libraries. The APN VM code primarily needs to make sure that the keys and certificates are properly distributed and that the SSL libraries are configured correctly.

The difficult thing about the shared key mode is that the public certificate must be distributed to all APNAs before the APN VM can communicate with them. On a large network, this is very inconvenient for the network administrator. To address this, the APNA includes a key distribution mechanism which allows the active NCN to push to the APNAs the public key for APN VM through the WAN. Thus, a user, such as a network administrator, transfers the public certificate from APN VM UI 310 to the NCN one time via the www browser 328. This is a two-step process where the network administrator first downloads the certificate from the APN VM 302 to the processing device 329 and then uploads the certificate from the processing device 329 to the NCN. The NCN then automatically distributes that file throughout the encrypted data network. The assumption here is that if the NCN trusts the APN certificate, then all of the other network nodes should also trust it. As part of downloading certificates from the NCN, clients receive a hash of a certificate file and verify that the file they receive matches that hash. A certificate file including the public security certificate and an associated hash of the certificate file is automatically distributed by the NCN to the client nodes and stored for future reference. Then it is determined whether a generated hash of the distributed certificate file matches the associated hash to verify the first public security certificate was properly received. Generally, the certificate file is not encrypted and the client has no need to verify if the public key in the received certificate file is valid. When a new public key is received, any existing connections that used the old public key are terminated.

In another embodiment, the NCN and client nodes can have multiple public security certificates installed simultaneously to allow the nodes to be managed by multiple network managers. When a network manager of an associated central server connects to an NCN or client node, the network manager provides credentials signed by the private key to the node. The NCN or client node checks the credentials with the public security certificates that have been installed. If the credentials match one of the public security certificates, then the node will permit the associated central server to make requests to the node.

Figure 6:
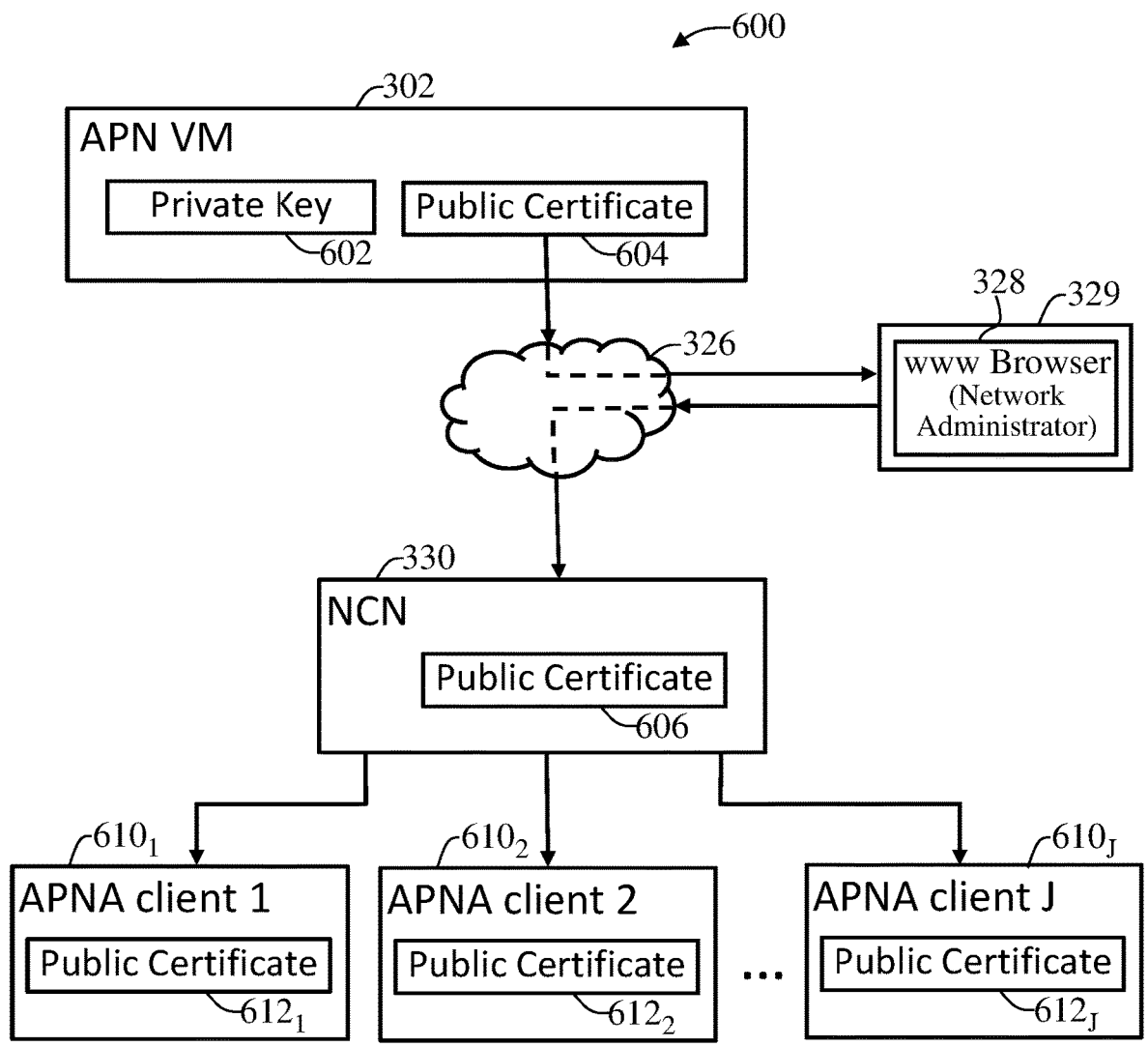
FIG. 6 illustrates an APN virtual machine (VM) security key distribution data flow in accordance with an embodiment of the present invention.

FIG. 6 illustrates an APN VM security key distribution data flow 600 in accordance with an embodiment of the present invention. The APN VM 302 stores a private key 602 and a public certificate 604. The public certificate 604 contains a public key that corresponds to the private key 602. The public certificate 604 is copied and downloaded over the management network 326 under control of a network administrator operating processing device 329 through www browser 328. The copy of the public certificate 606 is stored in the NCN 330. Under control of the network administrator, the copy of the public certificate 606 is copied and then distributed to APNA client 1 610$_1$, APNA client 2 610$_2$, . . . , APNA client J 610$_J$. On file transfers, each APNA verifies that the key being used in the file transfer corresponds to the public certificate that was installed locally on the APNA, thus allowing an SSL connection to be made indicating the file is a properly encrypted file that can be decrypted and received. If an incorrect key is used, the SSL connection is terminated.

Figure 7:
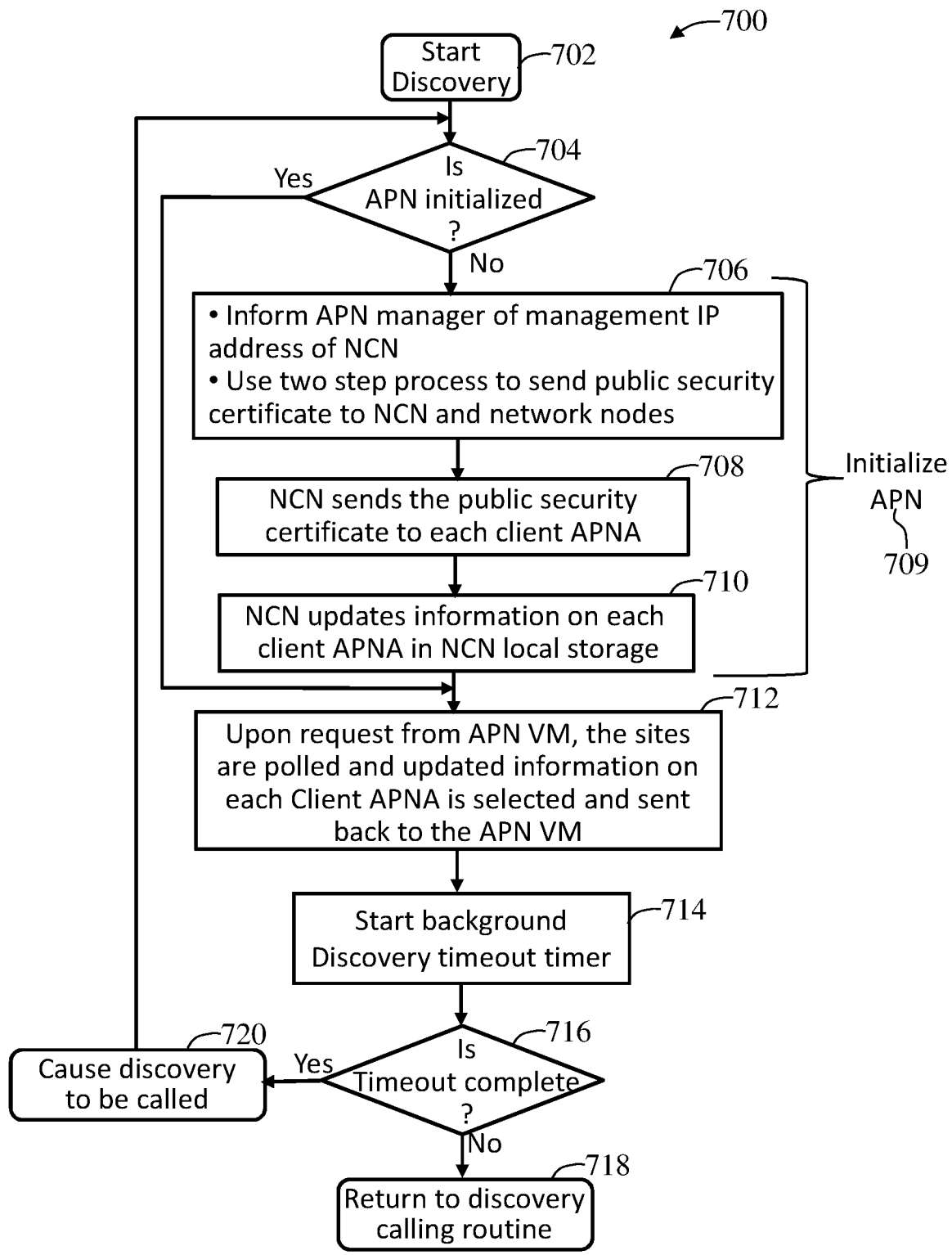
FIG. 7 illustrates an adaptive private network (APN) discovery process in accordance with an embodiment of the present invention.

FIG. 7 illustrates an adaptive private network (APN) discovery process 700 in accordance with an embodiment of the present invention. At block 702, the APN discovery process starts. At block 704, a determination is made whether the APN is initialized. If the APN is not initialized, the process 700 proceeds to blocks 706, 708, and 710 to initialize the APN in the order shown in FIG. 7. At block 706, an network control node (NCN) management Internet protocol (IP) address is obtained from a user as entered on the APN VM UI. Also, the APN manager 358 is informed of the management IP address of the NCN by writing the NCN's management IP address to a virtual file system (VFS) file, such as VFS 319. The NCN management IP address is needed to allow the APN manager 358 to talk to the NCN. Also, at block 706, a two-step process is started, for example, a public security certificate for the APN VM is downloaded to a web browser 328 in processing device 329 which then uploads the certificate to the NCN. At block 708, the NCN sends the public security certificate to each client APNA, completing the two-step process. At block 710, the NCN receives information on each client APNA, such as client node name and the client's management IP address, and updates the information in a NCN local storage, such as local storage 336 of FIG. 3A. For example, the NCN supplied information includes the management IP, site name and appliance ID, and whether the appliance is an HA appliance or not. Other client information is obtained by the APN VM system directly polling the clients at the IP addresses supplied by the NCN.

Returning to block 704, if the APN has already been initialized, the APN VM would already have the NCN's management IP address, and the public security certificates would already have been sent to the NCN and the NCN would have then sent them out to each client APNA Thus, the process 700 proceeds from block 704 to block 712. At block 712, upon request from the APN VM, updated information, such as provided by the shared memory process running in the background is selected and sent back to the APN VM. The selected information includes the name of the appliance, management IP address, model number, serial number, software revision, registry timestamp, connectivity information, polling status, and the like. At block 714, a background discovery timeout timer is started having a preselected time out period such as thirty minutes. At block 716, a determination is made whether the time out is complete. If the time out is not complete, the process 700 causes a return to the calling routine. If the time out is complete, the process 700 proceeds to block 720. At block 720, a means is provided to cause the discovery process to be called. Such a means may be provided by an interrupt or by a polling process. For example, when the discovery timeout timer expires, a time out interrupt is activated that causes the call to block 702 to repeat the discovery process. Alternatively, a time out bit may be set when the discovery timeout timer expires which is then found by a polling process and causes the start discovery process to be called. When the timeout timer expires, the discovery process 700 is repeated and if clients are added or deleted, a new configuration is created, the list of appliances is updated, and then the new configuration is polled for stats.

Figure 8:
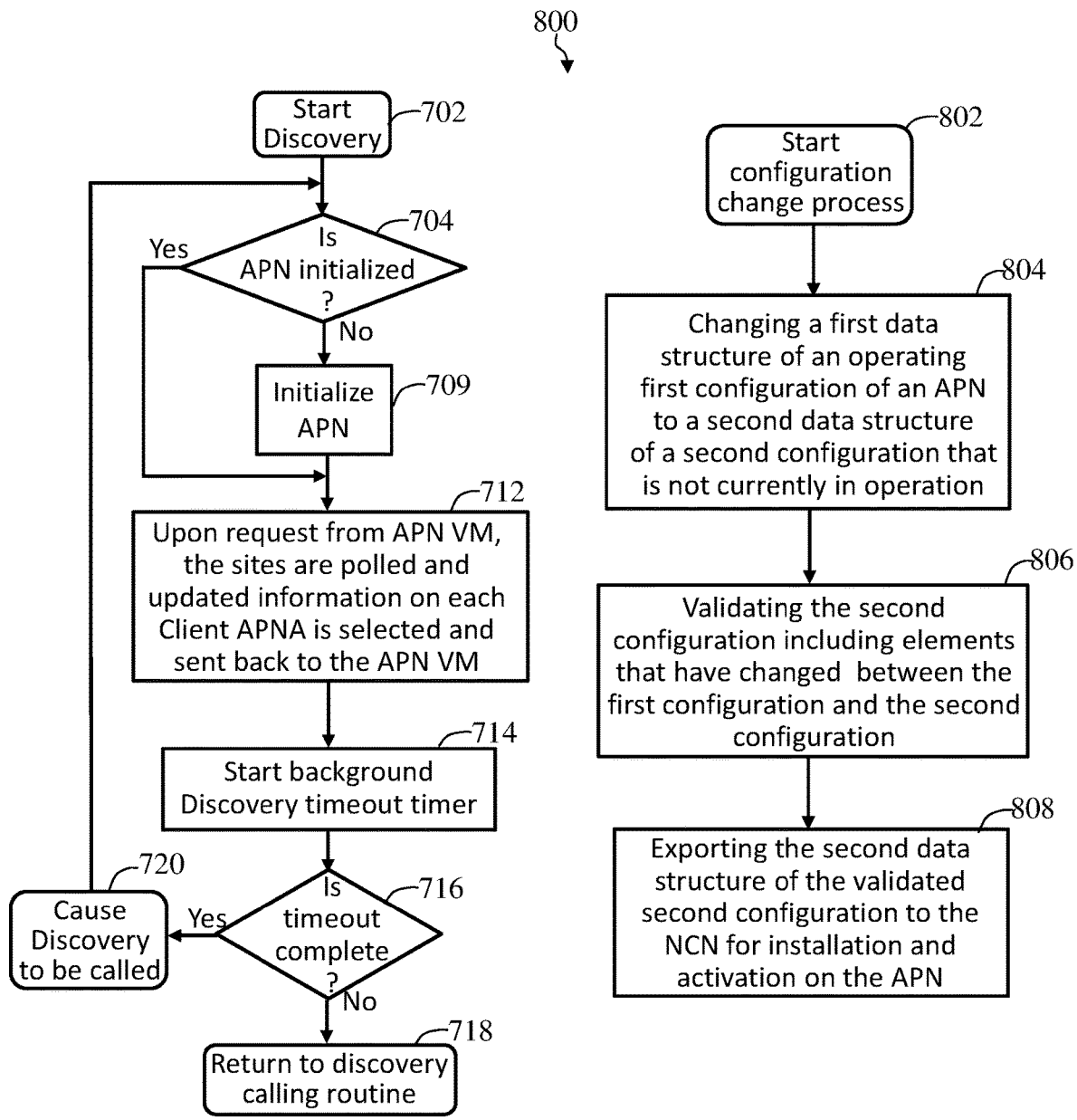
FIG. 8 illustrates discovery and configuration processes operating in a centralized management system to create and modify APN configurations and separately provide APN discovery of changes and operating characteristics of the APN in accordance with an embodiment of the present invention.

FIG. 8 illustrates discovery and configuration processes 800 operating in a centralized management system to create and modify APN configurations and separately provide APN discovery of changes and operating characteristics of the APN in accordance with an embodiment of the present invention. The onboard configuration facility change process, comprising blocks 802-808, and the discovery and monitoring process, comprising blocks 702-720, are separate functions. While the discover and monitoring process, comprising blocks 702-720, is operating on an APN, a configuration change process 802-808 may be initiated at any time separately from the discovery and monitoring process. Beginning at block 802, the configuration change process is started. At block 804, a first data structure of an operating first configuration of an APN is changed to a second data structure of a second configuration that is not currently in operation. For example, a site may be added to an initialized and currently operating APN which, in addition to the new site, causes changes to the interconnection links in the APN, including adding links between the new site and existing sites. Also, for example, an existing site may be removed from an initialized and currently operating APN which, in addition to the removal of the existing site, causes changes to the interconnection links in the APN, including changes in the interconnection links to the removed site.

At block 806, the second configuration goes through an audit and validation of the second configuration, including elements that have changed between the first configuration and the second configuration, prior to the second configuration being applied to the network. This audit greatly decreases risks of invalid configurations being placed on the production network. For example, inter-appliance dependencies are included in the audit checks to avoid creation of a conflicting configuration. The central configuration also assists with configuration bandwidth optimization for the network, by doing a mapping of the APN resources and their initial allocations. At block 808, the second data structure of the validated second configuration is exported to the NCN for installation and activation on the APN.

At block 702, the discovery and monitoring process is started. Blocks 704 and 709 ensure the APN is initialized. At block 712, upon request from the APN VM, updated information, such as learned client management IP addresses and site names that come from the NCN are provided by the shared memory process running in the background that is selected and sent back to the APN VM. Also, selected information which comes from each client directly includes the name of the appliance, model number, serial number, software revision, registry timestamp, connectivity information, polling status, and the like. For example, the APN manager receives topology information from each appliance to determine the connectivity between the appliances in the APN. For links that have changed from a previous configuration, when polling returns statistics from each appliance, the information indicates whether the link is present or not. The operating characteristics of the active operating configuration of the APN are monitored and analyzed by the APN VM 302 to support management of the APN. For example, the NCN automatically pushes security credentials to a new site or sites if such site or sites have been newly added to the APN. At block 714, a background discovery timeout timer and the discovery process continues through steps 716-720 as described above with regard to FIG. 7.

When the timeout timer expires, the discovery and monitoring process is repeated and if sites were added or deleted, the discovery process picks up the new topology and new operating characteristics of the APN for analysis and presentation.

While the present invention has been disclosed in the context of various aspects of presently preferred embodiments, it will be recognized that the invention may be suitably applied to other environments consistent with the claims which follow.

We claim:

1. A method to discover operating statistics for an adaptive private network (APN), the method comprising:
    configuring an APN with a centralized management system comprising an APN virtual machine (VM), a network control node (NCN) at a specified management Internet protocol (IP) address, and a plurality of client nodes, wherein the NCN is separate from each client node and is a single point of control of the plurality of client nodes within the APN;
    requesting, by the APN VM, a list of each client node at an associated management IP address of the plurality of client nodes from the single point of control NCN; and
    contacting, by the APN VM, each client node at the associated management IP address that was returned by the NCN to gather client node information including connectivity information between client nodes in the APN and operating statistics, wherein the client nodes do not have access to the management IP addresses of other client nodes and contacting the each client node at the associated management IP address includes directly polling, by the APN VM, using the management IP addresses, and over a management network comprising a logical or physical network separate from a logical or physical network used to carry user data plane application traffic, each of the client nodes for the connectivity information and operating statistics; and
    receiving the connectivity information and the operating statistics from the client nodes over the management network.

2. The method claim 1, wherein a discovery process operating separately from configuration information of the APN, determines a topology of the APN currently in operation has at least one additional client node than a previously operating topology and wherein the discovery process determines operating characteristics of the currently operating topology from the gathered client node information of each client node in the APN including the one additional client node and its interconnection links.

3. The method of claim 1, wherein a discovery process operating separately from configuration information of the APN, determines a topology of the APN currently in operation has at least one less client node than a previously operating topology and wherein the discovery process determines operating characteristics of the currently operating topology from the gathered client node information of each remaining client node in the APN.

4. The method of claim 1, wherein the client node information includes the operating statistics of the client node and associated connections.

5. The method of claim 1, further comprising storing the operating statistics gathered by the APN VM from each site in the APN into a statistics database associated with the APN VM for analysis and display.

6. The method of claim 1, further comprising requesting the NCN to poll each appliance to reply with a name and a network management IP address assigned to the appliance.

7. The method of claim 1, further comprising requesting each client node in the APN to gather statistics data, wherein the statistics data includes software revision, registry timestamp, and the connectivity information.

8. The method of claim 1 further comprising:
    sending a request for network management IP addresses to the NCN; and
    returning a list of network management IP information structures from the NCN, the information structures containing information from selected client nodes in the APN.

9. The method of claim 8, wherein the information structures comprise: network management IP addresses of a newly added site in the APN.

10. The method of claim 1 further comprising automatically pushing a secure sockets layer (SSL) certificate from the NCN to a site that has been added to the APN, wherein the added site and interconnection links to the added site are included in the gathered client node information.

11. A system to discover operating statistics for an adaptive private network (APN), the system comprising:
    a hardware processor;
    an APN virtual machine (VM) implemented by the hardware processor for performing centralized management of the APN;
    a network control node (NCN) at a specified management Internet protocol (IP) address;
    a plurality of client nodes, wherein the NCN is separate from each client node and is a single point of control of the plurality of client nodes within the APN,
        wherein the APN VM is configured to request, from the NCN, a list of each client node at an associated management IP address of the plurality of client nodes from the single point of control NCN;
    wherein the APN VM is configured to contact each client node at the associated management IP address that was returned by the NCN to gather client node information including connectivity information between client nodes in the APN and operating statistics;

wherein the client nodes do not have access to the management IP addresses of other client nodes and the APN VM is configured to contact each client node at the associated management IP address by directly polling, using the management IP addresses and over a management network comprising a logical or physical network separate from a logical or physical network used to carry user data plane application traffic, each of the client nodes for the connectivity information and operating statistics; and wherein the APN VM is configured to receive the connectivity information and the operating statistics from the client nodes over the management network.

12. The system of claim 11, comprising a discovery process operating separately from configuration information of the APN for determining a topology of the APN currently in operation has at least one additional client node than a previously operating topology and wherein the discovery process determines operating characteristics of the currently operating topology from the gathered client node information of each client node in the APN including the one additional client node and its interconnection links.

13. The system of claim 11 comprising a discovery process operating separately from configuration information of the APN for determining a topology of the APN currently in operation has at least one less client node than a previously operating topology and wherein the discovery process determines operating characteristics of the currently operating topology from the gathered client node information of each remaining client node in the APN.

14. The system of claim 11, wherein the client node information includes the operating statistics of the client node and associated connections.

15. The system of claim 11 wherein the APN VM is configured to store the operating statistics gathered by the APN VM from each site in the APN into a statistics database associated with the APN VM for analysis and display.

16. The system of claim 11 wherein the APN VM is configured to request that the NCN poll each appliance to reply with a name and a network management IP address assigned to the appliance.

17. The system of claim 11, wherein the APN VM is configured to request that each client node in the APN gather statistics data, wherein the statistics data includes software revision, registry timestamp, and the connectivity information.

18. The system of claim 11 wherein the APN VM is configured to:
send a request for network management IP addresses to the NCN; and
receive a list of network management IP information structures from the NCN, the information structures containing information from selected client nodes in the APN including network management IP addresses of a newly added site in the APN.

19. The system of claim 11 wherein the NCN is configured to automatically push a secure sockets layer (SSL) certificate from the NCN to a site that has been added to the APN, wherein the added site and interconnection links to the added site are included in the gathered client node information.

20. A non-transitory computer readable medium having stored thereon executable instructions that when executed by a processor of a computer control the computer to perform steps comprising:
configuring an adaptive private network (APN) with a centralized management system comprising an APN virtual machine (VM), a network control node (NCN) at a specified management Internet protocol (IP) address, and a plurality of client nodes, wherein the NCN is separate from each client node and is a single point of control of the plurality of client nodes within the APN;
requesting, by the APN VM, a list of each client node at an associated management IP address of the plurality of client nodes from the single point of control NCN; and
contacting, by the APN VM, each client node at the associated management IP address that was returned by the NCN to gather client node information including connectivity information between client nodes in the APN and operating statistics, wherein the client nodes do not have access to the management IP addresses of other client nodes and contacting the each client node at the associated management IP address includes directly polling, by the APN VM, using the management IP addresses, and over a management network comprising a logical or physical network separate from a logical or physical network used to carry user data plane application traffic, each of the client nodes for the connectivity information and operating statistics; and
receiving the connectivity information and the operating statistics from the client nodes over the management network.

* * * * *